(12) United States Patent
Selbrede et al.

(10) Patent No.: US 7,450,799 B2
(45) Date of Patent: Nov. 11, 2008

(54) CORNER-CUBE RETROREFLECTORS FOR DISPLAYS

(75) Inventors: Martin G. Selbrede, Conroe, TX (US); Garth Gobeli, Albuquerque, NM (US); B. Tod Cox, Houston, TX (US); Daniel K. Van Ostrand, The Woodlands, TX (US); Martin A. Kykta, Austin, TX (US)

(73) Assignee: Uni-Pixel Displays, Inc., The Woodlands, TX (US)

( * ) Notice: Subject to any disclaimer, the term of this patent is extended or adjusted under 35 U.S.C. 154(b) by 0 days.

(21) Appl. No.: 11/766,007

(22) Filed: Jun. 20, 2007

(65) Prior Publication Data

US 2007/0242334 A1    Oct. 18, 2007

Related U.S. Application Data

(63) Continuation-in-part of application No. 11/338,251, filed on Jan. 24, 2006.

(51) Int. Cl.
  *G02B 6/26* (2006.01)
(52) U.S. Cl. .................. 385/31; 359/222; 359/851; 359/853
(58) Field of Classification Search ............ 385/31; 359/222, 851, 853
  See application file for complete search history.

(56) References Cited

U.S. PATENT DOCUMENTS

| 3,905,682 | A | 9/1975 | Meyerhofer |
|---|---|---|---|
| 4,218,834 | A | 8/1980 | Robertsson |
| 4,526,441 | A | 7/1985 | Dowden |
| 4,629,319 | A | 12/1986 | Clarke et al. |
| 4,647,967 | A | 3/1987 | Kirschner et al. |
| 4,835,090 | A | 5/1989 | Sawyer |
| 4,891,529 | A | 1/1990 | Braun et al. |
| 4,920,385 | A | 4/1990 | Clarke et al. |
| 5,005,973 | A | 4/1991 | Mimmack et al. |
| 5,046,839 | A | 9/1991 | Krangle |
| 5,052,800 | A | 10/1991 | Mimmack et al. |
| 5,123,737 | A | 6/1992 | Eichweber |
| 5,132,823 | A | 7/1992 | Kamath et al. |

(Continued)

OTHER PUBLICATIONS

U.S. Appl. No. 11/338,251, filed Jan. 24, 2006, Van Ostrand et al.

*Primary Examiner*—Ellen Kim
(74) *Attorney, Agent, or Firm*—Fish & Richardson P.C.; Kelly K. Kordzik

(57) ABSTRACT

Enhancement of the contrast ratio of optical flat panel displays by integrating an array of corner-cube retroreflectors into the front face of the optical display, said integration involving mutual adaptation of both the display and the corner-cube retroreflector geometry to unite the two disparate optical systems. The light emission from the display passes through the truncated vertex of the corner-cubes to the observer. The display directs its emitted light through the vertex apertures (either as a natural behavior, or by interposing a registered array of light concentrators between the display and the corner-cube array). The improvement in contrast ratio arises due to the corner-cube retroreflectors' ability to direct incident ambient light directly back to its source, rather than the viewer's eyes. Ambient light reflections are not attenuated but maximized; this maximization is directed away from the viewer, causing the array to appear dark even in direct sunlight.

21 Claims, 9 Drawing Sheets

U.S. PATENT DOCUMENTS

| | | | |
|---|---|---|---|
| 5,182,663 A | 1/1993 | Jones | |
| 5,212,596 A | 5/1993 | Andrus | |
| 5,319,491 A | 6/1994 | Selbrede | |
| 5,396,350 A * | 3/1995 | Beeson et al. | 349/62 |
| 5,428,468 A * | 6/1995 | Zimmerman et al. | 349/62 |
| 5,449,597 A | 9/1995 | Sawyer | |
| 5,455,689 A | 10/1995 | Taylor et al. | |
| 5,546,184 A | 8/1996 | Downs | |
| 5,548,403 A | 8/1996 | Sommargren | |
| 5,572,086 A | 11/1996 | Tong et al. | |
| 5,572,363 A | 11/1996 | Fergason | |
| 5,580,156 A | 12/1996 | Suzuki et al. | |
| 5,605,784 A | 2/1997 | Sawyer | |
| 5,606,458 A | 2/1997 | Fergason | |
| 5,621,572 A | 4/1997 | Fergason | |
| 5,629,806 A | 5/1997 | Fergason | |
| 5,737,124 A | 4/1998 | Sarayeddine | |
| 5,767,976 A | 6/1998 | Ankerhold et al. | |
| 5,808,589 A | 9/1998 | Fergason | |
| 5,815,306 A | 9/1998 | Sheridon et al. | |
| 5,838,403 A * | 11/1998 | Jannson et al. | 349/65 |
| 5,849,468 A | 12/1998 | Sawyer | |
| 5,910,894 A | 6/1999 | Pryor | |
| 5,917,646 A | 6/1999 | Sheridon | |
| 5,933,236 A | 8/1999 | Sommargren | |
| 5,935,743 A | 8/1999 | Sawyer | |
| 5,952,148 A | 9/1999 | Sawyer | |
| 5,982,352 A | 11/1999 | Pryor | |
| 5,995,690 A * | 11/1999 | Kotz et al. | 385/25 |
| 5,999,307 A | 12/1999 | Whitehead et al. | |
| 6,008,945 A | 12/1999 | Fergason | |
| 6,019,375 A | 2/2000 | West, Jr. | |
| 6,046,792 A | 4/2000 | Van Der Werf et al. | |
| 6,088,941 A | 7/2000 | Inbar et al. | |
| 6,101,749 A | 8/2000 | Inbar et al. | |
| 6,147,805 A | 11/2000 | Fergason | |
| 6,163,755 A | 12/2000 | Peer et al. | |
| 6,184,969 B1 | 2/2001 | Fergason | |
| 6,215,920 B1 | 4/2001 | Whitehead et al. | |
| 6,243,055 B1 | 6/2001 | Fergason | |
| 6,309,074 B1 | 10/2001 | Inbar et al. | |
| 6,379,009 B1 | 4/2002 | Fergason | |
| 6,424,786 B1 * | 7/2002 | Beeson et al. | 385/146 |
| 6,507,441 B1 | 1/2003 | Eisenberg et al. | |
| 6,509,566 B1 | 1/2003 | Wamsley et al. | |
| 6,512,512 B1 | 1/2003 | Blanchard | |
| 6,522,472 B1 | 2/2003 | Green | |
| 6,535,674 B2 | 3/2003 | Veligdan | |
| 6,595,648 B1 | 7/2003 | Woodgate et al. | |
| 6,618,138 B2 | 9/2003 | Khoury | |
| 6,636,355 B2 * | 10/2003 | Moshrefzadeh et al. | 359/460 |
| 6,657,766 B2 | 12/2003 | Minoura et al. | |
| 6,678,056 B2 | 1/2004 | Downs | |
| 6,741,779 B2 | 5/2004 | Veligdan | |
| 6,787,976 B2 | 9/2004 | Minoura et al. | |
| 6,788,366 B2 | 9/2004 | Sawayama et al. | |
| 6,816,141 B1 | 11/2004 | Fergason | |
| 6,819,507 B2 | 11/2004 | Minoura et al. | |
| 6,843,564 B2 | 1/2005 | Putilin et al. | |
| 6,844,956 B2 | 1/2005 | Minoura et al. | |
| 7,018,573 B2 | 3/2006 | Wulff | |
| 7,042,440 B2 | 5/2006 | Pryor et al. | |
| 7,045,278 B2 | 5/2006 | Ihara et al. | |
| 7,072,048 B2 * | 7/2006 | Downs | 356/500 |
| 7,079,114 B1 | 7/2006 | Smith et al. | |
| 7,098,137 B2 | 8/2006 | Ihara et al. | |
| 7,098,891 B1 | 8/2006 | Pryor | |
| 7,098,976 B2 | 8/2006 | Minoura et al. | |
| 7,230,764 B2 * | 6/2007 | Mullen et al. | 359/619 |
| 7,345,824 B2 * | 3/2008 | Lubart et al. | 359/641 |

* cited by examiner

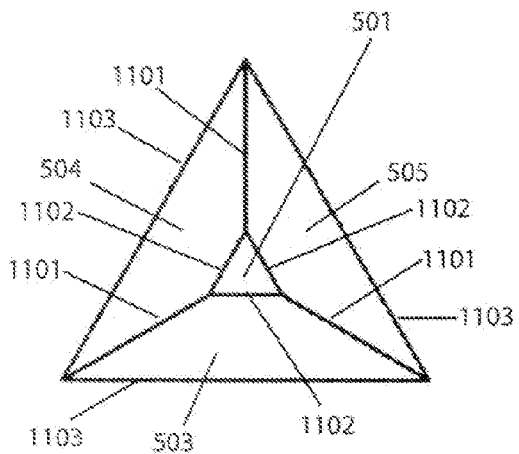
Figure 11a
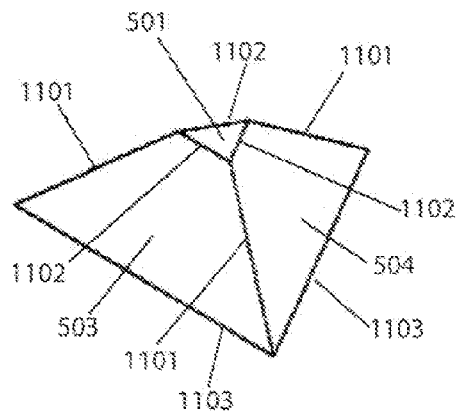
Figure 11b
FIGURE 11
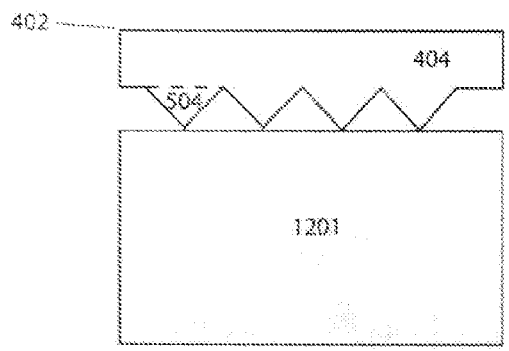
Figure 12a
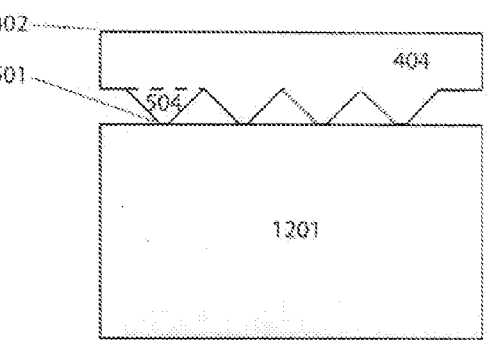
Figure 12b
FIGURE 12

CORNER-CUBE RETROREFLECTORS FOR DISPLAYS

This application is a continuation-in-part of U.S. patent application Ser. No. 11/338,251, which is hereby incorporated by reference herein.

TECHNICAL FIELD

The present invention relates to the field of displays, and more particularly to enhancing optical flat panel displays by improving the contrast ratio performance through reducing the amount of ambient light reflected from the display surface into an observer's eyes.

BACKGROUND

Unless viewed in a pitch black environment, flat panel display systems deal with the phenomenon of ambient light reflection. The ambient light reflected from a display's surface can cause the display images to appear washed out, since the emitted image is competing with the reflected light bouncing off the display surface into the eyes of the observer. Attenuating this reflected light is important to gaining acceptable contrast ratio performance for flat panel displays. Contrast ratio is universally regarded as the strongest indicator of the visual quality of a display. It is highly desirable for a display to exhibit excellent contrast ratio even where ambient light is very high (such as in direct sunlight striking the display surface).

This goal, however, has become increasingly accessible. Many of the techniques used to improve contrast ratio by attenuation of ambient light reflection exhibit either limitations in their own performance, or undesirable side effects.

The advent of Broad Band Anti-Reflective (BBAR) coatings has served to reduce ambient light reflection to below 1% over a significant portion of the visible spectrum, but in the case of direct sunlight (where the energy to be attenuated is very high), the attenuation being achieved is still inadequate. Moreover, such BBAR coatings can cause a perceived tint in the image of the display, due to differential attenuation of the spectrum (strong attenuation of reds and greens, but weaker attenuation of reflected blues and violets).

The prior art contains various approaches to the problem of maximizing the contrast ratio of emissive and transmissive flat panel display systems deployed in environments where ambient light intensity is high (e.g., outdoors on a sunny day). In a darkened room, a given display may yield a measured contrast ratio of 1000:1 or greater, but outdoors it may measure only 3:1. Performance expectations have been lowered to the point where a 5:1 contrast ratio outdoors is considered good. Reduction of Fresnel reflections at crucial interfaces (the various layers comprising a display system) has led to the development of BBAR coatings as a first line of defense against excessive reflected light, which leads to washed out images and poor contrast ratio measurements.

Given the limitations usually applied (out of power efficiency considerations) to the emitted output of flat panel displays, the reduction in ambient reflections has traditionally taken center stage in the effort to improve contrast ratios. LCD-based displays, for example, have variously used absorbing layers, circular polarizer layers, and/or elaborate dark mask structures in front of the main display proper to further reduce the amount of ambient light reflected from the system. Some manufacturers, in desiring better performance than provided by emissive or transmissive systems, have switched to transflective architectures, presumably because it is easier to change architectures than to fight ambient light reflection. Manufacturers that stayed the course with their emissive and transmissive architectures faced major engineering tradeoffs. For example, increasing the image intensity of an LCD display involves high power consumption and reduced life spans for the backlight systems delivering that extra intensity to the display.

SUMMARY

The problems outlined above may at least in part be solved in some embodiments of the present invention as addressed below.

The need in the art to enhance contrast ratio performance for flat panel displays deployed in environments where the ambient light levels are high may be addressed by several embodiments of the present invention.

In one embodiment, the specific display technology to be enhanced is the current iteration of the display technology originally disclosed in U.S. Pat. No. 5,319,491, which is incorporated herein by reference in its entirety, wherein pixels emit light using the principle of frustrated total internal reflection. In that display system, light is edge-injected into a planar slab waveguide and undergoes total internal reflection within the guide, trapping the light inside it. Pixels are electrostatically controlled MEMS structures that propel an elastomeric thin film layer (hereafter termed the Active Layer, which is controllably deformable) across a microscopic gap (measuring between 300 and 1000 nanometers) into contact or near-contact with the waveguide, at which point light transits across from the waveguide to the thin film layer either by direct contact propagation and/or by way of evanescent coupling. Co-pending U.S. patent application Ser. No. 11/338,251, an optical enhancement to U.S. Pat. No. 5,319,491, discloses a microlens array (or, more generally, a planar array of micro-optical structures) integrated into the underside and/or topside of the Active Layer. The micro-optical structures on the underside of the Active Layer contact the waveguide at their distal ends, which are structured as flat plateaus on the optical structure (which might be configured as a hexagonal-based pyramid, or a truncated cone, known as a frustum. There are multiple micro-optical structures per pixel, not a one-for-one correspondence. This geometry entails an aperture restriction of light departing from the waveguide through the pixels. The present invention involves a modification to the geometry of the micro-optical structures, such that they become configured as corner-cube retroreflector structures while retaining a small distal plateau by means of way of truncation of the corner-cube tip. This modification to the Active Layer, in conjunction with appropriate addition of broadband antireflective (BBAR) layers at all pertinent material boundaries (top and bottom of the Active Layer and top and bottom of the waveguide), provides maximum enhancement in contrast ratio performance due to the retroreflectors' unique direction-specific handling of incident ambient light (namely, directing it away from the observer' eyes).

In a second embodiment, a static (non-moving, non-deforming) layer of truncated corner-cube reflectors in an x-y array (hereafter the Retroreflector Layer) is positioned over a matching layer of non-imaging light concentrator structures (the element array of which has a one-to-one correspondence to the corner-cube reflector structures in the Retroreflector Layer), which is further disposed on top of a conventional flat panel display system, such as a liquid crystal display (LCD). This embodiment involves the application of the present invention to display technologies other than that disclosed in U.S. Pat. No. 5,319,491, that is, to displays not utilizing the principle of frustrated total internal reflection of light at the pixel level. This second embodiment is both a generalization and an adaptation of the first embodiment. The adaptation (the interstitial layer of registered non-imaging light concentrator structures) is necessary to realize the generalization, because the structure of the corner-cube retroreflectors is such that light passes through them only through the small truncated region at the corner-cube tip. The purpose of the matching layer of non-imaging light concentrator structures (hereafter the Concentrator Layer) is to channel light from the underlying flat panel display directly into the triangular apertures comprising the flat underside of the truncated corner-cubes comprising the Retroreflector Layer. Alternatively, a generalized retroreflector layer can be added, without such concentrator structures, that can still emit considerable energy from the display surface (either through the aperture, if present, or through the transparent facets comprising the retroreflectors in the array). The joint operation of the Retroreflector Layer and Concentrator Layer enables the present invention to be properly deployed in display technologies other than that disclosed in U.S. Pat. No. 5,319,491. In all instances, the appropriate application of BBAR coatings to each interface of interest would further enhance the contrast ratio performance of the aggregate display system.

Depending on the size of the optical structures comprising the Retroreflector Layer, it may be advisable to implement a modification to the corner-cubes to reduce diffractive scatter and other deleterious optical effects arising where the planes comprising the corner-cubes (the corner-cubes facets) meet. Since the edges are a potential source of scattering noise (from various different physical effects), the noise can be attenuated by adding a small amount of light-absorbing material on all the edges of the corner-cubes where the three facets that form the corner-cubes meet. Only enough absorber should be added as would be sufficient to adequately reduce noise from such scattering. Excess absorber placed on the main facets of the corner-cube stand to both reduce corner-cube retroreflectivity and to potentially reduce the brightness of the image being displayed (by way of deleterious absorption). Such absorptive means may be necessitated on the regions between one corner-cube and the next, and this could be implemented using a suitably patterned and registered mask structure designed to interpose an absorbing region between any such region subject to undesired light scattering and the observer.

The need in the art to enhance the contrast ratio performance of emissive and/or transmissive flat panel display systems in the presence of high ambient light levels (including operation in direct sunlight) is addressed by the embodiments hitherto disclosed. The present invention can be implemented on a host of devices that could be expected to be used outdoors, such as cell phones and PDAs, where such performance in high ambient light conditions would be highly desirable and lead to vastly improved image generation by the integrated displays used in such devices.

The foregoing has outlined rather broadly the features and technical advantages of one or more embodiments of the present invention in order that the detailed description of the invention that follows may be better understood. Additional features and advantages of the invention will be described hereinafter which form the subject of the claims of the invention.

The details of one or more embodiments of the invention are set forth in the accompanying drawings and the description below. Other features, objects, and advantages of the invention will be apparent from the description and drawings, and from the claims.

BRIEF DESCRIPTION OF DRAWINGS

A better understanding of the present invention can be obtained when the following detailed description is considered in conjunction with the following drawings, in which:

FIG. 5 illustrates several different views of a modified solid corner-cube retroreflector structure, where said modification entails the truncation and flattening of the distal end of the corner-cube geometry that serves to enhance contrast ratio when deployed in proper geometric configuration and orientation within the structure of the display technology illustrated in FIGS. 2-4, where

FIG. 9 illustrates in cross-sectional view various layer interfaces in the display technology shown in FIGS. 2 through 4, both with and without implementation of an embodiment of the present invention, where

FIG. 10a illustrates a side view indicating a position of light concentrator structures to be inserted in the optical system to be deployable as a contrast ratio-enhancing means for a broad range of flat panel display technologies, and where FIG. 10b illustrates detailed side and perspective views of an individual light concentrator structure, and where FIG. 10c illustrates proper geometric alignment at the contact plane between each of the light concentrator structures and the flattened vertices of their respective, associated modified corner-cube retroreflectors, maintaining a registered one-to-one correspondence between them; and where FIG. 10d illustrates a variation of this embodiment, where hollow and solid regions are reversed;

FIG. 11 illustrates in greater detail a structure of the modified corner-cube retroreflector of FIG. 5, further defining the edges between the facets that form the various faces of the corner-cube retroreflectors, where FIG. 11a shows a top-down view, and where FIG. 11b shows a perspective view;

FIG. 12 several variations that omit light concentrator structures, where

FIG. 12a shows an unmodified corner-cube retroreflector array disposed parallel to the surface of a flat panel display system, and where FIG. 12b shows a modified corner-cube retroreflector array disposed parallel to the surface of a flat panel display system;

DETAILED DESCRIPTION

Figure 1:
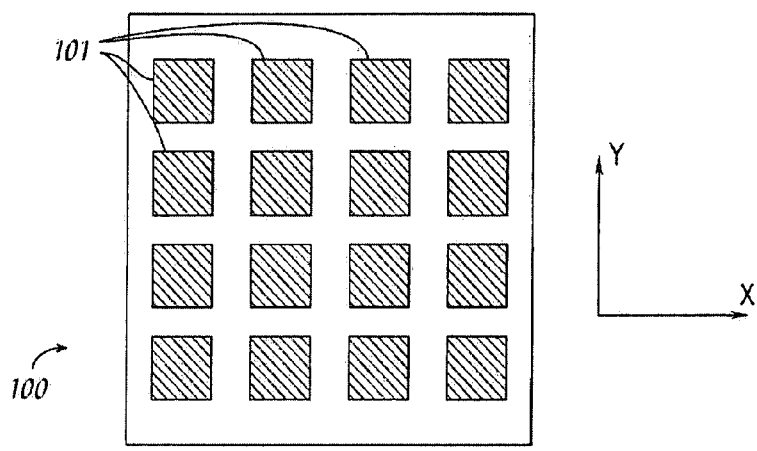
FIG. 1 illustrates an external view of a display, as seen by the viewer, showing an arbitrary plurality of pixels, irrespective of pixel technology, in a rectangular coplanar array with which any of several embodiments of the present invention may be integrated to secure enhanced contrast ratio performance.

Enhancement to Frustrated Total Internal Reflection Display

As stated in the Background Information section, individual pixels in a flat panel display that exploits selectively controllable frustrated total internal reflection via MEMS actuation, such as the flat panel display systems disclosed in U.S. Pat. No. 5,319,491, may require integration of micro-optical structures to insure that frustrated light being controllably coupled out of the waveguide reaches the viewer's eyes.

Cross-referenced patent application Ser. No. 11/338,251 discloses a general species of micro-optical structures associated with the movable membrane/element that is electrostatically propelled between a quiescent position (300 nanometers or greater gap between membrane/element and the waveguide in which total internal reflected light is trapped) and a contact or near-contact position causing light trapped in the waveguide to couple across into the membrane/element, specifically the array of micro-optical structures, to be directed to the viewer and to efficiently overcome the potential deleterious effects should total internal reflection arise on the top surface of said membrane/element due to unsuitable incidence angles at the membrane/air boundary closest to the observer.

In the interests of securing efficient light extraction from the waveguide and optimizing its dispersion into the half space occupied by the observer, most standard optical microstructures pay a price in regard to ambient light reflection, adversely affecting system contrast ratio measured in environments with moderate to high ambient light. What may be utilized is a choice of optical micro-structure geometry that provides the advantages sought be such structures without causing the undesirable side effect of significantly harming the display's measured contrast ratio. This structure may simply involve a surface modulation of the topology of the waveguide-facing side of the membrane/element being propelled into contact or near contact with the waveguide.

Embodiments of the present invention disclose a geometry for the optical microstructures to be fabricated in the waveguide-facing side of the membrane/element being propelled between quiescent and optically-coupled positions in regard to the waveguide. In lieu of the various pyramidal, conical, and cylindrical structures disclosed in Ser. No. 11/338,251, this disclosure describes fabrication of an array of retroreflector structures, whether hollow or solid in construction, in a suitable packing arrangement.

In the following description, numerous specific details are set forth to provide a thorough understanding of the present invention. However, it will be apparent to those skilled in the art that the present invention may be practiced without such specific details. In other instances, detailed physical features are idealized in order not to obscure the present invention in unnecessary detail. For the most part, details considering timing considerations and the like have been omitted inasmuch as such details are not necessary to obtain a complete understanding of the present invention and are within the abilities of persons of ordinary skill in the relevant art.

Figure 2A:
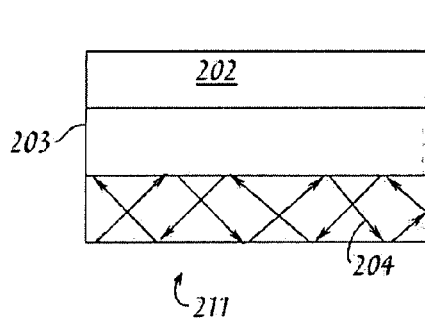
FIGS. 2A and 2B illustrate a side view of the internal pixel geometry of a specific type of pixel technology, showing 'off' and 'on' states (FIGS. 2A and 2B, respectively) of individual pixels of FIG. 1 that exploit the principle of frustrated total internal reflection to allow or prevent emission of light from the pixel surface.
Figure 2B:
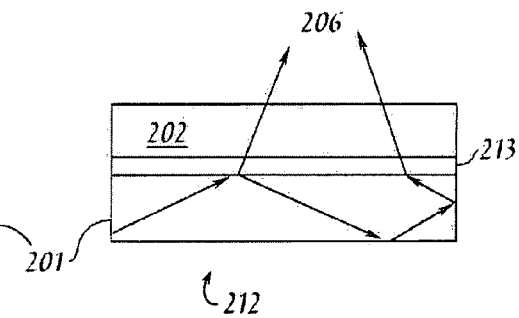

The general concept of TMOS, as originally expressed in U.S. Pat. No. 5,319,491, is briefly illustrated in FIGS. 1, 2A, 2B and 3. In FIG. 1 the display 100 is shown from the viewer's point of view, with pixels 101 arranged in a rectangular matrix. The side view 200 of one pixel 101 is shown, first in FIG. 2A. in the 'off' position 211, and second in FIG. 2B, in the 'on' position 212. The internal light guide 201, and the light waves 204 contained therein, are shown relative to the active layer's light coupling material 202, with 'off' cladding 203 in the space between the two. As described in the Background information section's discussion, 'off' 211 represents TIR (total internal reflection) and no light emission, and 'on' 212 represents FTIR (frustrated TIR) with light waves 206 released from the light coupling material 202. The mechanical change in position of the active layer 202 toward the light guide 201 causes the cladding thickness to decrease to 'on' cladding 213.

Figure 3:
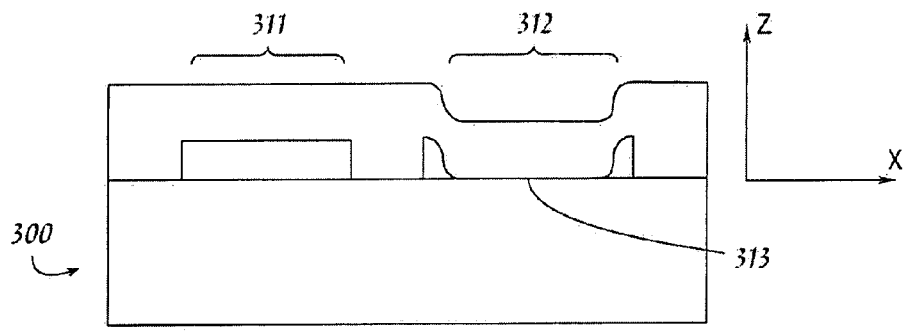
FIG. 3 illustrates a side view of two adjacent pixels exploiting the pixel technology shown in FIGS. 2, one each in 'off' (FIG. 2A) and 'on' (FIG. 2B) states.

FIG. 3 shows a simplified side view representation 300 of two adjacent pixels, to more clearly contrast the 'off' 311 geometry with the 'on' 312 geometry. Of particular note is the special case for the 'on' cladding 313 (corresponding to 213 in FIG. 2B) shown where contact takes place and therefore the cladding thickness 313 is zero. In this direct contact case, additional modes of coupling may become available and hence light coupling can be enhanced beyond the proximity case.

Figure 4:
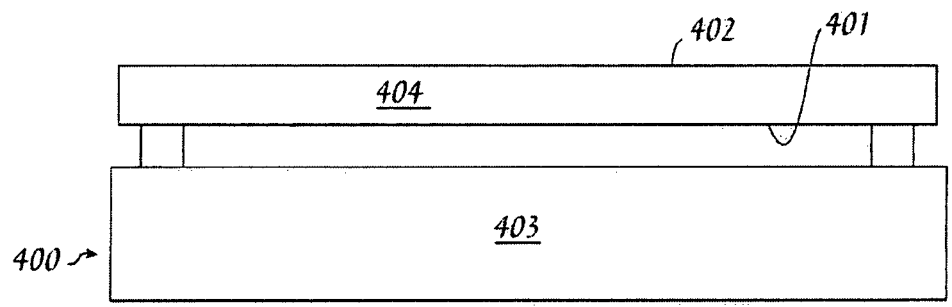
FIG. 4 illustrates a side view of one isolated pixel, in 'off' state, for the pixel technology shown in FIG. 2, specifying the movable membrane/element that controls the emission and non-emission of light from this display technology.

FIG. 4 shows a more detailed side view of one pixel 101, to clearly illustrate the context in which embodiments of the present invention are to be deployed. FIG. 4 shows an isolated view 400 of a pixel 101, in the 'off' geometry as in FIG. 3 'off' 311, with two particular surfaces of the light coupling layer 404 (corresponding to 202 in FIG. 2A) identified —the internal surface 401 that faces the light guide 403 (corresponding to 201 in FIG. 2A), and the external surface 402 that faces the viewer.

Cross-referenced patent application Ser. No. 11/338,251 further discloses superaddition of geometric features on one or both of the surfaces 401 and 402. The present invention presupposes the absence of any geometric features or modifications to the flat planar surface of 402, the external surface of the light coupling layer 404, although the potential for adding a thin film broadband antireflective coating to 402 will be retained. Disclosed herein is an addition of corner-cube retroreflectors on surface 401, plus an optional addition of broadband antireflective (BBAR) coatings on one or more of the relevant optical surfaces (namely, external surface 402, and either surface of the waveguide 403, as well as an optional addition of BBAR coating to any features to be added to internal surface 401 that directly face the waveguide 403. Embodiments of the present invention may also incorporate anti-stiction means at the interface between 403 and 401, such as an ultra-thin layer of dodecane, for the purposes of reducing the surface energy when the two transparent dielectrics make contact with one another. The subsequent images provide greater detail on these features.

Figure 5A:
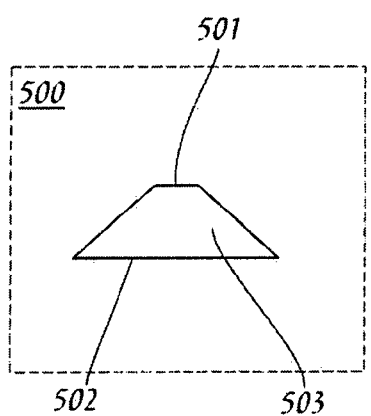
FIG. 5a illustrates a side view of a single modified corner-cube retroreflector, and where
Figure 5B:
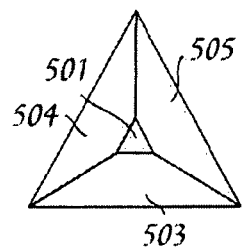
FIG. 5b illustrates a top view of a single modified corner-cube retroreflector, and where
Figure 5C:
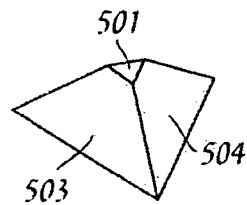
FIG. 5c illustrates a perspective view of a single modified corner-cube retroreflector, and where
Figure 5D:
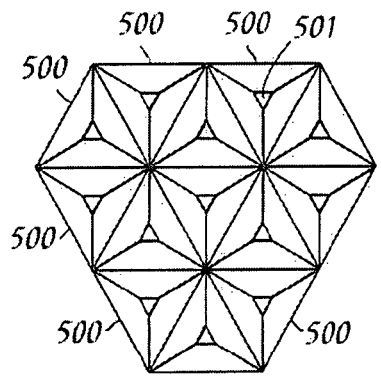
FIG. 5d illustrates a arbitrary plurality of triangularly-packed modified corner-cube retroreflector structures in a top down view where the bases of each corner-cube retroreflector are coplanar, and where
Figure 5E:
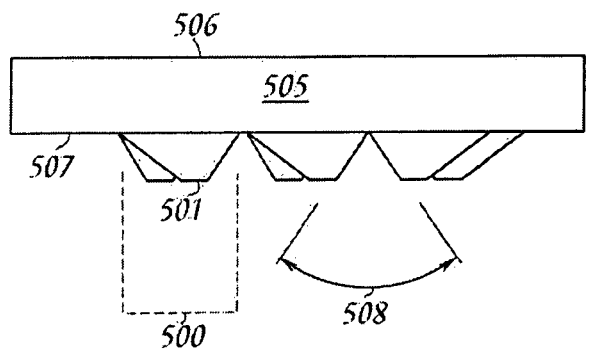
FIG. 5e illustrates a side view of several modified solid corner-cube retroreflectors integrated within the movable membrane/element of FIG. 4, in proper orientation, wherein the plurality of corner-cube retroreflectors may entail many solid corner-cube retroreflectors packed into the area of a single pixel as shown in FIG. 1.
Figure 6:
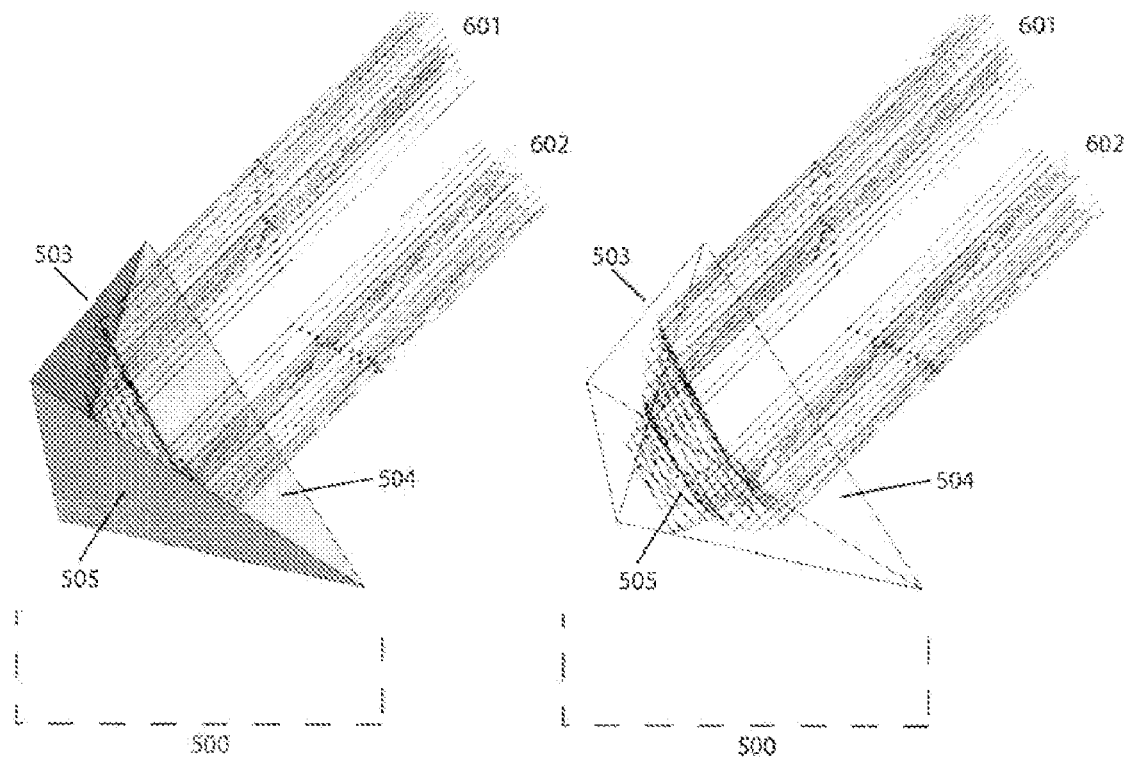
FIG. 6 illustrates a principle of operation of an unmodified corner-cube retroreflector, whether solid or hollow, and its ability to return incident light back to the source along a return path that is parallel to the incidence path of incoming light.

FIG. 5 discloses the basic geometry of truncated corner-cube retroreflectors, while FIG. 6 illustrates an operational principle of a conventional (non-truncated) corner-cube retroreflector. The behaviors of the truncated versions in FIG. 5 are very similar to that of the conventional corner-cube retroreflector shown in FIG. 6. To understand the desirability of corner-cube retroreflector technology in connection with contrast ratio enhancement, consider the corner-cube retroreflector technology in connection with contrast ratio enhancement, consider the corner-cube retroreflector 500 shown in FIG. 6. Retroreflector 500 is comprised of three triangular facets 503, 504 and 505, each of which is at right angles (90 degrees) to the other two facets. If these facets form reflective surfaces (either by being coated with a reflective coating or by dint of the exploitation of total internal reflection—the well-known distinction between hollow and solid retroreflectors, respectively), then incoming light rays 601 that enter the retroreflector 500 will be reflected out of the retroreflector along an exit path 602 that is parallel to the entrance path 601. FIG. 6 illustrates this both in a solid-view on the left-hand image, and in wire-frame view on the right-hand image. Reflection of incident light 601 on consecutive facets that are 90 degrees apart with respect to each other results in a complete 180 degree translation of the exiting light 602, albeit offset by a small distance.

In FIG. 5a, the retroreflector 500 is shown in a side view. The figure shows a truncated retroreflector, with the top corner of the corner-cube sheared off to create a flat plateau 501 that is parallel to the base 502. Both the base 502 and the flattened tip region 501 are equilateral triangles. Due to the orientation in FIG. 5a, only one of the three facets is shown (503). In FIG. 5b, the same truncated retroreflector 500 is shown in a top-down view. The tip 501 is facing up, and all three facets 503, 504, and 505 are now visible. This structure constitutes a corner cube because the three facets 503, 504 and 505 are at right angles one to another. The primary deviation from conventional corner-cube retroreflector geometry is the flattened plateau 501. Traditional corner-cubes form a pointed vertex in lieu of a flat equilateral surface. FIG. 5c illustrates the same structure in a perspective view, in which only two of the facets 503 and 504 are visible, 505 being hidden on the far side of the retroreflector. The truncated tip 501 is visible at the top; it is this small triangular region that will make contact with the total internal reflection waveguide to frustrate TIR and couple light out to the viewer through the base 502. Each pixel 101 may have many corner-cube retroreflectors 500 associated with it: the area available for coupling light out of the waveguide would be the sum of all 501 regions making contact when the pixel is actuated, as at region 313 in FIG. 3. The position and orientation of the retroreflectors 500 will be further described below. The ratio in area between the top 501 and the base 502, both of which are equilateral triangles in shape, is determined by optical considerations to be disclosed further on. An acceptable range for the area of 501 can be between 4% and 10% of the area of 502. The smaller than 501 becomes relative to 502, the greater the retroreflector effect, but a corresponding reduction in optical emission of the display being enhanced is potentially possible since the area of surface 501 also serves as the local aperture for emission from the display. Therefore, optimization of the parameters being manipulated may be performed in choosing a retroreflector truncation profile for any given application.

There are several ways to aggregate the retroreflectors 500 into a close-packed array. The retroreflector elements can be packed using hexagonal packing, rectangular packing, or triangular packing. A triangular packing is illustrated in FIG. 5d, which shows a top-down view of thirteen retroreflectors 500 where the bases 502 are in contact one with another. These elements form a repetitive optical structure that can extend for many retroreflectors in both x and y dimensions to create a large planar retroreflective structure. The truncated, flattened tips of the retroreflectors 501 in FIG. 5d provide the aperture through which light emitted from the display is passed on to the observer. However, ambient light going the other direction, into the display system, as exemplified by 601 in FIG. 6, will encounter the orthogonal facets 503, 504, and 505 of the retroreflector structures 500 and be returned to the source without being reflected into the observer's eyes.

The positioning of the retroreflector elements 500 in respect to the movable membrane/element that is selectable controllably propelled into contact or near-contact with the waveguide can be discerned by consulting both FIG. 4 and FIG. 5e. In FIG. 4, we note the membrane (or element) 404 that is held in spaced-apart relation to the waveguide 402. The precise actuation and suspension/stand-off mechanism utilized for membrane 404 is not indicated, it being outside the scope of this enhancement and related to the antecedent patents to the present invention.

Figure 7:
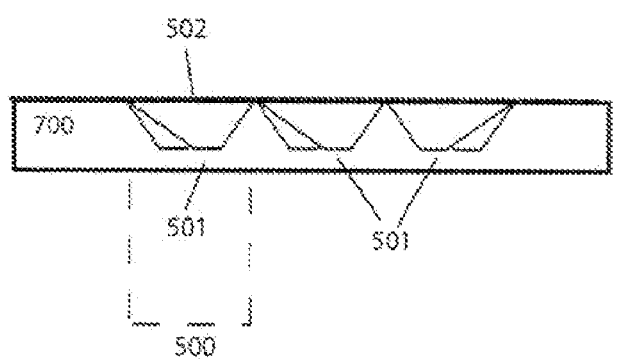
FIG. 7 illustrates implementation of a hollow modified corner-cube retroreflector within the movable membrane/element of FIG. 4, where the void that forms the retroreflector does not extend to both sides of the membrane/element in which it is fabricated.
Figure 8:
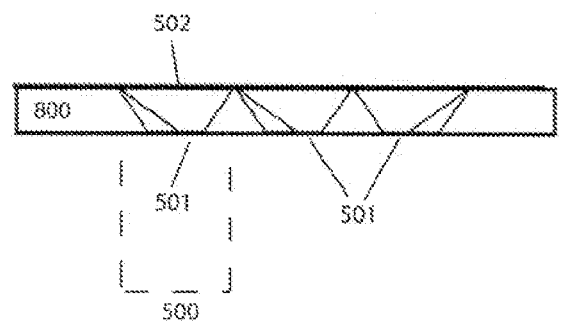
FIG. 8 illustrates implementation of a hollow modified corner-cube retroreflector within the movable membrane/element of FIG. 4, where the void that forms the retroreflector does extend to both sides of the membrane/element in which it is fabricated, forming a series of tetrahedral through-holes in said membrane/element.

There are two types of corner-cube retroreflectors: those that use total internal reflection, also known as solid retroreflectors, and those that use reflective coatings, known as hollow retroreflectors. The physical orientation of the two is fundamentally identical so far as the facets are concerned, the only difference being what material exists on either side of the facets: transparent dielectric or air/nothing. The difference is that between convex and concave geometries, with the shape being the same in either instance. FIG. 5e illustrates the solid retroreflector structure that uses total internal reflection, while FIGS. 7 and 8 illustrate two variations of the hollow retroreflector structure, which utilize an application of a reflective coating on the facets 503, 504 and 505. Hollow retroreflector structures may be adapted to the embodiment described below. Note that solid retroreflector structures as depicted in FIG. 5e have utility for all embodiments of the present invention.

When corner-cube retroreflectors 500 (in FIG. 5) are integrated (either by superaddition or some other process) into the membrane 404, that flat bases of the corner-cubes 502 will be coplanar, and are understood to be coplanar in FIG. 5d. However, a configuration where the bases of the corner-cubes are not coplanar is within the scope of the invention. FIG. 5e renders this explicitly, such that the movable element/membrane 505 (which is equivalent to element 404 in FIG. 4) has an upper surface 506 (corresponding to 402) and lower surface 507 (corresponding to 401), such that the plurality of retroreflectors 500 disposed onto the lower surface 507 have the base of each retroreflector 502 lie on the same plane as 507. As a consequence, the truncated planar tips 501 of each retroreflector 500 are also parallel to the planar surface of 507. This orientation of the corner-cube retroreflectors, which is the conventional one used in manufacturing sheets of retroreflective material, entails an angle 508 between the facets of adjacent retroreflectors 500 of approximately 70.58 degrees, as shown in FIG. 5e. This value for the angle 508 insures that the three facets 503, 504 and 505 of each individual retroreflector 500 will form right angles with respect to one another while keeping the flattened distal tip 501 parallel both to the membrane/element 505 (or 404) of which it is a part, and to the waveguide 403 with which it will make contact or near-contact during pixel actuation.

Figures 9A, 9B:
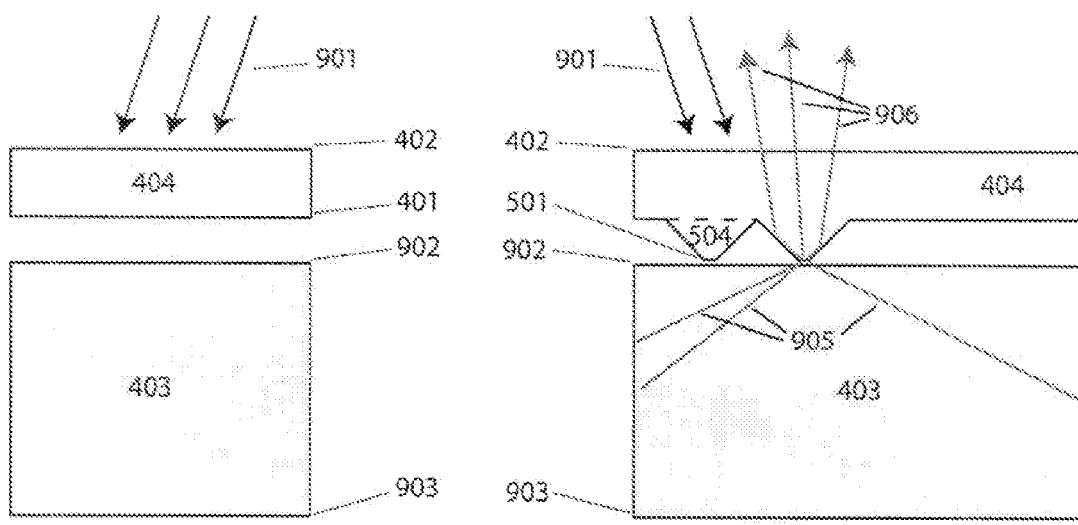
FIG. 9a illustrates a general situation for displays where embodiments of the present invention are not implemented, and where
FIG. 9b illustrates a situation for displays where embodiments of the present invention have been introduced into the layer stack.

FIG. 9a illustrates the series of interfaces within the optical structure of the unadorned base display that may give rise to poor contrast ratios in high ambient light. Ambient light 901 is incident upon the outer surface 402 of element/membrane 404, which is the first interface encountered by incident light encountering the display. Fresnel reflection off of surface 402 sends part of the light back into the half space from which the incident light arrived, and part of this reflected light reaches the observer's eyes. Light that does enter element/membrane 404 encounters the bottom surface of the element/membrane 401, where a similar Fresnel splitting of incident rays occurs, sending some fraction of light back to the observer's eyes once again. This process is repeated at the upper surface 902 of the total internal reflection waveguide 403, and again at the lower surface 903 of the waveguide 403. Multiple contributions from all four of these interfaces give rise to the total light reflected back into the observer's eyes, and this energy constitutes the noise floor of the optical system. With the insertion of additional layers into the stack, increasing the interfaces from 4 to some higher number, the possibility of increasing the aggregate reflectivity of the entire stack may increase.

Embodiments of the present invention may add broadband antireflective coatings to one or more of the interfaces 402, 401, 902 and 903. While this reduces the aggregate reflectivity, contrast ratios are still nonetheless compromised. Therefore, the optical enhancement illustrated in FIG. 9b improves upon the solution to the issue of improved contrast ratio in high ambient light conditions. The topology of lower surface 401 is studded with a tightly-packed plurality of corner-cube reflectors as shown in FIG. 5e. Rather than the featureless plane 401 being coated with a broadband antireflective (BBAR) coating, that coating may be applied to each of the flattened distal planar surfaces 501 of each retroreflector 500. The BBAR coatings applied to surfaces 402, 902, and 903 may be unchanged. It should be understood that the better the performance of the BBAR coatings, the better the contrast ratio enjoyed by the device. Herpin equivalent BBAR coatings which are ultra-thin (circa 250 to 300 nanometer thick for the entire layer) have achieved reflectance values between 0.1% and 0.5%, and thus are useful candidates for deployment on all relevant surfaces (planes 402, 902, 903 and the plurality of distal surfaces 501 associated with the plurality of retroreflectors comprising the bottom surface of membrane/element 404, elsewhere labeled 505).

The presence of the retroreflectors 500 entails two effects, one related to the controlled emission of light from the display system when the pixel is actuated, the other related to the enhanced display system's behavior in regard to incident ambient light. Each will be discussed in turn.

The unadorned display system (see FIGS. 2A and 2B) frustrates total internal reflection by propelling a material 202 across a gap 203 (presumably air or vacuum, but in any case a very low refractive index medium) into contact or near-contact with a waveguide 201 in which light rays 204 injected from an appropriate light source (not illustrated) at the waveguide's edge are traveling at angles that conserve total internal reflection within the waveguide. Prior to the propelling of element 202 into contact or near-contact, the distance 203 is sufficiently large (generally 300-500 nanometers) that little to no light couples across the gap into the element 202. However, when the gap 203 is reduced to contact or near-contact (213), light inside the waveguide 201 will leave the waveguide, cross the gap 213 arid enter element 202, and then be emitted toward the observer. This fundamental light valve system, based on selectively controllable frustration of total internal reflection (FTIR), can be manipulated to produce color according to conventional field sequential color generation techniques, some of which are articulated in detail in U.S. Pat. No. 5,319,491.

When embodiments of the present invention are deployed, the subsequently enhanced display behaves somewhat differently than FIG. 2 indicates due to the presence of the plurality of retroreflectors and optional BBAR coatings. FIG. 9b illustrates how optical performance of the display is handled when the topology of otherwise flat planar surface 401 has new optical features (the plurality of retroreflectors 500) distributed in close-packed high-density array across said surface).

Light rays 905 (corresponding to the rays 204 of FIG. 2A) obeying the laws of total internal reflection will remain inside the waveguide 403 until the element/membrane 404 is propelled across the gap to the point where the distal surfaces 501 of the plurality of retroreflectors 500 come into contact or near-contact with the top surface 902 of the waveguide 403. Light within the waveguide 403 will undergo frustration of total internal reflection at the point of contact or near-contact, and light rays 905 will travel through the surface 501, functioning now as an aperture, into the retroreflector 500 and possibly strike any of the three facets 503, 504 and/or 505 of the retroreflector before exiting the top surface 402 of the membrane/element to reach the viewer. In this way, the enhanced display performs the same function as the unadorned display, excepting that the aperture through which light passes to the outside world is restricted to the surface area of the plurality of flattened distal surfaces 501 which are in contact or near-contact with the top surface 902 of the waveguide 403 during the on-cycle (actuated state) of the pixel proper. This reduced aperture for the enhanced version of the FTIR display may entail adjustments in the waveguide system to insure suitable output, such adjustments including improved containment of TIR light within the waveguide by mirroring a significant portion of the surface through which light is inserted into the waveguide. Such mirroring adjusts the equilibrium state of the system, changing the balance between light that exits the waveguide through the entrance point and light that exits the waveguide through activated pixels. This principle is disclosed in a co-pending application Serial No. 11/215,515 involving the proper tuning of FTIR systems to simultaneously insure high system uniformity and maximized optical output. In summary, the enhanced display can be configured to emit light at or near the same output levels as the unadorned display.

An advantage gained over the enhanced version of the display involves not its handling of emitted light, which would be expected to approximately match that of the unadorned display (see preceding discussion and performance comparison between FIG. 2 and FIG. 9), but rather its handling of incident ambient light. Consider FIG. 9 once more. When ambient light 901 strikes the optical stack illustrated in FIG. 9*a*, the composite amount of light reflected back to the observer is purely a function of the summed contributions from all four interfaces 402, 401, 902 and 903 (including some secondary and tertiary effects not enumerated herein so as not to unduly complicate the basic analysis). However, when ambient light strikes the enhanced display as shown in FIG. 9*b*, new effects arise which serve to vastly reduce the reflection of incident ambient light back into the observer's eyes.

The present invention does not alter the initial reflection off the top surface 402, which remains constant between both the unadorned and enhanced versions of this FTIR flat panel display system. The reflection off of this surface may be governed by the efficiency of the BBAR coating applied to it. With high quality BBAR coatings, the reflectivity off of top surface 402 can be reduced to as low as 0.1% over the visible spectrum. The remaining 99.9% of incident light continues to travel through element 404 deeper into the optical stack.

However, all subsequent interfaces are very much affected by the presence of the plurality of retroreflectors 500 on the lower surface of element/membrane 404 (also known as 505). A first major effect arising from the presence of the retroreflectors in the stack is that the amount of light reaching the next interface is vastly reduced, since the area of that second interface is now the sum total of all flattened distal surfaces 501, which is a small fraction of the area of the same interface 401 in the unadorned display. A presumed value of 4% is reasonable, and as asserted earlier, the range can comfortably fall between 4% and 10%, without necessarily being restricted to this range. The consequence of this reduction is that from the second interface on, 96% of the light that would have been subject to additional back-reflections into the observer's eyes has been removed from consideration. Maintaining BBAR coatings at these surfaces (the surfaces 501 of every retroreflector, and both surfaces 902 and 903 of the waveguide 403) may enhance the prevention of reflection that reduces perceived contrast ratio. Moreover, any light so reflected from interfaces 902 and 903 must then pass back through the small surface areas 501, further restricting the amount of light reflected back into the observer's eye.

While this first effect accounts for the final destiny of incident ambient light rays that pass through the surfaces 501 of the retroreflectors and travel deeper into the optical stack, this only accounts for 4% of the light that has passed through from the ambient environment through the top surface 402 of membrane/element 404. The present invention's handling of the other 96% of the light that reaches the plurality of elements 500 is novel and unique. Rather than attempting to extinguish this undesired ambient light that has entered into the flat panel display, the present invention is designed to return virtually all of it to the ambient environment. The unique component of the present invention stems from the circumstance that the presence of retroreflectors insures that the light thus reflected is directed back to its source in the ambient environment, and not back toward the observer's eyes. This is a consequence of retroreflector behavior as illustrated in FIG. 6, where light striking the facets of a retroreflector structure will be returned such that the exiting rays are parallel to the rays entering the retroreflector. It is for this reason that the corner-cube arrays appear dark to the naked eye, even when viewed in direct sunlight, because the ambient light cannot be reflected into the observer' eyes. The only light reaching the observer's eyes from the retroreflector structures is light that already exists in the thin cylindrical volume between the retroreflector and the eye proper, which is much less optical energy than what is available in the ambient environment. As a consequence, retroreflector arrays appear dark when properly constructed.

Therefore, in regard to FIG. 9*b*, incident ambient light rays 901 that travel past the top surface 402 encounter the solid retroreflector structures 500 (facet 504 of which is shown in side-view). Assuming the area ratio between flattened distal surface 501 and the base of the retroreflector 402 is 4:100, 96% of the light reaching the facets of each retroreflector 500 in the array constituting the plurality of retroreflectors disposed onto the bottom surface of 404 is returned back to the source and directed away from the observer's eyes. The remaining 4% progresses deeper in the optical stack and undergoes Fresnel reflection events at the subsequent interfaces at 501, 902, and 903. Light that is Fresnel reflected off of surfaces 902 and 903 must be able to re-enter one of the surfaces 501 in order to return to the observer's eyes and harm contrast ratio.

Thus, corner-cube retroreflectors that have their tips truncated as described above are able to deliver vastly improved contrast ratios while still enabling emission of FTIR light from the base display system, as originally disclosed in U.S. Pat. No. 5,319,491.

Enhancement to a Generalized Class of Flat Panel Displays

The optical principle for the flat panel display being enhanced by the embodiment of the present invention previously described involves frustration of total internal reflection. The light to be emitted to the viewer is extracted from the TIR waveguide by a plurality of retroreflectors 500 that from a multiple retroreflector array (a section of which is illustrated in FIG. 5*d*), generally configured such that may retroreflectors 500 may be part of a single pixel 101.

The foregoing description details how the presence of corner-cube retroreflectors can significantly enhance contrast ratio performance of FTIR-based flat panel display systems. The following discloses a generalization and modification of the foregoing embodiment to a broad range of display systems that are not based on the principles of frustrated total internal reflection. These systems include liquid crystal displays (LCDs), organic light-emitting diode displays (OLEDs), plasma displays, electrochromic displays, cathode ray tube (CRT) displays, liquid crystal on silicon (LCOS) displays, and other display systems that would benefit from enhanced contrast ratio performance in high ambient light environments.

Figure 10:
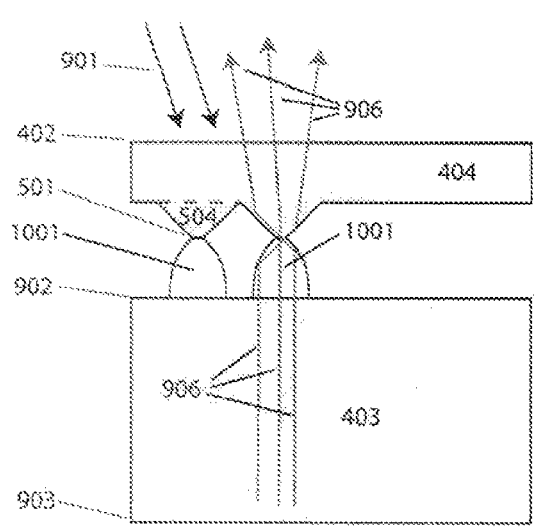
FIG. 10 illustrates another embodiment of the present invention suited for deployment in any generalized flat panel display technology, such as LCD displays, in contrast to restricted deployment for displays that exploit frustrated total internal reflection to control its pixels, where
Figure 10:
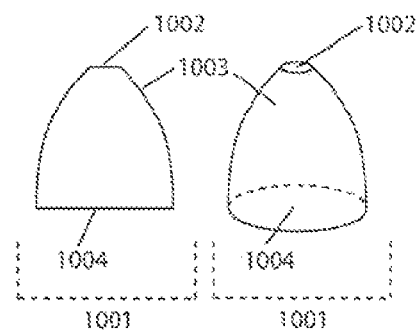
Figure 10:
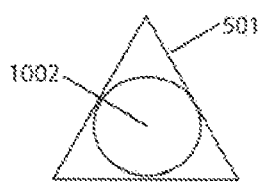
Figure 10:
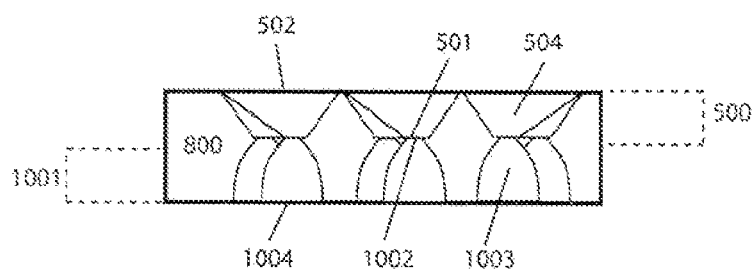

FIG. 10 illustrates how embodiments of the present invention may be suitably adapted to provide contrast ratio enhancement for a generalized flat panel display system. It should be noted that there are many elements in common between the system illustrated in FIG. 10*a* and that illustrated in FIG. 9*b*. It is understood that there are no movable elements in this system, but rather that the entire enhancement is a static structure. This is a concomitant of the fact that the display system's light valves are presumed to already exist, and to be modulating and emitting light to form a desired image (video or static), and that this light enters the bottom side of the surface 903 to travel up and out surface 402. The rays forming the light emitted from the display system to be enhanced are denoted 906, and are seen to be traveling generally upward through the optical stack, in contradistinction to the TIR-compliant light rays traveling in the waveguide 403. It is therefore understood that the light rays forming the image are already traveling toward the viewer's eyes prior to the addition of the enhancement.

As disclosed previously, any light that is intended to leave the system passes through the flattened distal ends 501 of the plurality of retroreflectors 500 integrated into the top surface 404. The aggregate area of all surfaces 501 is the only aperture through which light can be reliably emitted from the system. Since this represents as little as 4% of the available area that light 906 will naturally strike upon encountering interface 902 (see FIG. 10a), the loss of 96% of the emitted light from the display system generating the light 906 forming the desired image is clearly untenable. (If the retroreflector walls are transparent rather than coated with a reflective material, this effect will be at least partially mitigated, which is an optical consideration leading to another embodiment disclosed herein). The modification to maximize the emission of light from the display as the generated light 906 encounters the plurality of coplanar retroreflectors 500 associated with layer 404 (which is no longer conceived of as a movable element) involves the addition of a matching plurality of non-imaging light concentrators, which collect light emitted from the display and direct all, or most of it, through the small flattened apertures 501 at the distal ends of the retroreflectors 500. These concentrator structures are shown in FIG. 10a in side view and denoted as element 1001. While the two representative concentrators 1001 in FIG. 10a are not shown in a close-packed configuration, but exhibit an unduly large gap between them, it is to be understood that the physical orientation of both the retroreflectors 500 and the concentrators 1001 may be optimized to insure maximum collection of emitted light from the flat panel display system and its being focused to enter the small flattened regions 501 of each associated retroreflector. The efficiency of collection is a function of the output distribution from the flat panel display proper. For displays with a Lambertian output distribution, light concentration is moderately efficient, but for displays that emit more energy closer to the on-axis viewpoing position, the efficiency of re-direction into the aperture 501 becomes commensurately greater, in keeping with the Lorentz invariant intrinsic to the display's etendue properties.

FIG. 10b illustrates one possible geometry for the concentrators 1001. The left hand image shows a side view of a concentrator, which may be configured as a compound parabolic concentrator based on a geometry known to those skilled in the art of maximizing optical energy transfer using non-imaging optics. The cross-section of this concentrator is circular, as is evident in the perspective view of the right hand side of FIG. 10b. The base 1004 is where light from the flat panel display enters, which may or may not encounter the curved surface 1003. By either direct entry or reflection off of the curved surface 1003, light entering the base 1004 passes through the smaller aperture 1002 and is thus able to enter the corner-cube retroreflector's flattened distal end 501.

One orientation of the contact plane between each retroreflector 500 and each concentrator 1001 is shown in FIG. 10C, where it is seen that the tip 1002 of the concentrator 1001 fits inside the equilateral region 501 that forms the flattened distal end each retroreflector 500. Each concentrator has a matched corner-cube retroreflector where the mating point between them is as shown in FIG. 10c. While it is possible for 1002 to be smaller than necessary to fit inside 501, it should not be larger than the geometry of circle inscribed inside the triangle will be, for that will result in undesirable leakage (and subsequent loss) of emitted light that is prevented from entering the retroreflector 500.

It should be understood that nay light concentrator structure that collects light from the display and redirects it into the small apertures 501 provided at the ends of the plurality of corner-cube retroreflectors 500 distributed across the plane of the composite contrast ratio enhancement system achieved by fabrication and deployment may be used. Therefore, the cross-section of the concentrator need not be circular, although a circular cross-section was used for the sake of illustration above and in FIGS. 10b and 10c. The cross-sections may be rectangular, or the concentrator may have a square base and a circular tip, etc. An advantage of a square base is that the packing of the concentrators in a coplanar plurality provides minimum loss of emitted light from the display. Concentrators with circular bases 1004 cannot be packed any tighter than intimate contact base-to-base, which entails a loss of more than 21% of the light emitted from the display, which represents light that never entered the circular bases 1004 of the concentrators but was incident on the regions between the concentrators, where said light was unable to ever reach the apertures 501 to the outside world.

A variation of the concentrator geometry includes fabrication of a tetrahedral structure that has the same top-down footprint as the retroreflector shown in FIG. 5b, excepting that the facets thereof are no longer orthogonal to one another as they are in a retroreflector, but are configured at a different angle to avoid, rather than implement, the retroreflector behavior associated with facets orthogonal to one another. An advantage gained from such a tetrahedral geometry for the concentrator is the fact that it is an excellent match geometrically for the complementary retroreflector 500 and its aperture 501. When tetrahedrons that look like FIG. 5c, except bearing non-orthogonal facets, are substituted for the concentrators 1001 in FIG. 10a, a similar light concentration function arises as in the case of compound parabolic concentrators or other geometries chosen for the plurality of concentrators 1001 distributed between the incoming light emitted from the display and the retroreflectors 500 that provide the contrast ratio improvement. It is self-evident that the structure 403 in FIG. 10a functions not as a TIR waveguide, but rather functions as a transparent plate of appropriate thickness serving as a plane upon which the concentrators 1001 are disposed. Light from the display 906 enters transparent plate 403 from the bottom surface 903, with the flat panel to be enhanced being either in spaced-apart relation to transparent plate 403 or in planar contact with it. In either case, any generalized flat panel display system may enjoy the contrast ratio-enhancing behavior that can be realized with the deployment of a planar array of flattened corner-cube retroreflectors between the flat panel display and the observer.

Attenuate Scattering and/or Diffraction from the Retroreflectors

Embodiments of the present invention disclose the insertion of a plurality of coplanar corner-cube reflectors between the imaging system (flat panel display) and the observer, with the retroreflectors oriented such that incident ambient light is returned to the ambient light source along ray paths parallel to the incident ray paths, thereby forbidding light reflected off of the corner-cube retroreflectors from entering the observer's eyes. The construction of small corner-cube retroreflectors raises the possibility of scattering and diffraction off of the edges where the various facets meet in the corner cube. Embodiments of the present invention attenuate the effect of such scattering and diffraction if and where it occurs.

Referring to FIG. 11, specifically FIG. 11a, there is shown an enlarged view of FIG. 5b. In FIG. 11a, all the features of FIG. 5b are included, and nine additional edges are identified. The edges between facets 503, 504 and 505 are denoted as the three edges labeled 1101. The edges between the facets and the flattened distal end of the corner cube 501 are labeled 1102, while the edges along the base 502 of the retroreflector are labeled 1103. In the sample plurality of thirteen retroreflectors 500 shown in FIG. 5d, each retroreflector 500 meets a neighboring retroreflector 500 at an edge 1103.

All nine of these edges are potential sources of scattering and diffraction of incident light. The most serious diffraction or scattering is likely to occur at the three inter-facet edges 1101 for well-packed retroreflectors, and at retroreflector boundaries 1103 in cases where retroreflector-to-retroreflector geometric errors may dominate.

To the extent that scattering and/or diffraction from any or all of these specified edges causes a significant loss of contrast ratio enhancement, local superaddition of a dark absorbing layer (or any other material that creates the desired effect) to the edges of interest may be performed. The attenuating material, whether absorptive or premised on some other principle of operation, may be added only along the edges that require it (e.g., along the inter-facet edges 1101 if they prove to be a source of significant scattering and/or diffraction, and/or along the inter retroreflector edges 1103 if they warrant such compensatory treatment). Alternatively, the absorbing means can be construed as a patterned mask disposed onto surface 402, or 502, or 506, designed to block any light scattered off the identified edges from reaching the observer's eye. As a result of such super-added attenuators, the contrast ratio improvements are not themselves harmed by undesirable scattering from the components (the retroreflectors 500) that yield the desired improvement.

Hollow Retroreflector

The embodiment above has been described with reference to solid retroreflector structures as disclosed in FIG. 5. Such retroreflectors utilize total internal reflection themselves to cause incident light to be returned to its source (as shown in FIG. 6). The embodiment may employ hollow retroreflectors. The concentrators shown in FIG. 10 are then feeding light, not into a solid retroreflector, but into a hole or void shaped like a solid retroreflector. This is further illustrated in FIGS. 7 and 8, which show the two variations for creating a coplanar plurality of hollow retroreflectors within a contiguous planar sheet of material 700 (which is equivalent to element 800 in FIG. 8) which may or may not be transparent. FIG. 7 illustrates a side view of such hollow retroreflectors. The structure 500 defines a hole in the same shape as the solid retroreflectors of FIG. 5e. The plurality of geometric holes of designated shape formed in planar material 700 are further modified in that a reflective coating may be applied to all three facets 503, 504, and 505 comprising the walls of the defined voids, but no reflective coating is to appear at the small equilateral triangle surface at the bottom of the hole 501, which forms the aperture through which light from the display being enhanced by the present invention is to be inserted from below. FIG. 8 is a variation of the system described in FIG. 7, the difference being that the height of planar material 700 is greater than the height of the retroreflector voids 500 in FIG. 7, but the height of planar material 800 is equal to the height of the retroreflector voids 500 formed with in it. Therefore, the voids 500 in planar material 800 are through-holes that extend all the way through the thickness of 800. Accordingly, it is impossible to coat region 501 with a reflective coating in the case of FIG. 8 since there would be nothing for the coating to be coated on. Either variation, as disclosed in FIG. 7 or FIG. 8, provide the correct behavior in respect to the desired retroreflective behavior being applied to incident ambient light.

Referring to FIG. 7, due to the material between the bottom of the retroreflector-shaped void 501 and the material 700 the void was formed in, light to be inserted into the aperture at the bottom of the void 501 travels through some of the material 700 before arriving at the designated aperture; if the concentrators 1001 do not sufficiently focus the light into the region 501 in FIG. 7, despite passing through some of the material 700 to arrive at region 501, that light will be lost and the measured emission intensity of the flat panel display will be thereby attenuated (among other possible deleterious consequences). Therefore, care must be taken in both positioning and focusing given the presence of intervening material 700 between the concentrator 1001 and the aperture 501.

In the case of the through-hole approach illustrated in FIG. 8, the overlap shown in FIG. 10c may become problematic, insofar as the triangular region 501 in FIG. 10c is a hole, through which the top of the concentrator 1002 will obviously be able to pass. If the circular top of the concentrator 1002 is larger than an inscribed circle would be inside the equilateral triangle 501, this will reduce the amount of light entering the retroreflector 500 since the beam size from 1002 will exceed the aperture 501 at the three points of overlap.

The same problem arises for other concentrator shapes relative to the aperture. While it might be possible to allow for some intrusion of the tip 1002 of the concentrator 1001 into the retroreflector void 500 through the distal end 501, one would have to provide for means to prevent the penetration from harming the void by splitting the material 800 where it is at its thinnest (in the material surrounding the hole 501 in FIG. 8). On the other hand, referring to FIG. 10a, it is possible to insert a rigid low refractive index material in the region between 404 and 403, even if the topmost structure is configured as hollow retroreflectors as in FIG. 7 or FIG. 8, providing a suitable mount point between the respective subassemblies, one containing the retroreflective voids 500 and the other containing the light concentrators 1001. One suitable candidate for this interstitial rigid low refractive index material would be silica-based aerogels, which enjoy low refractive indices (often below 1.1) and significant mechanical strength and high Young's modulus values. Such an interstitial layer would provide adequate mechanical strength in keeping the two subassemblies in a spaced-apart relation without placing undue mechanical stress on the voids due to pinpoint contact with the concentrators at the weakest mechanical point of the voids.

The concentrator structures may also be configured as voids, just as the retroreflectors may be (as in FIGS. 7 and 8). In this configuration, it becomes somewhat easier to bring the two structures (concentrator plus retroreflector) together, conceivably in a thin prefabricated film designed specifically for this purpose. One embodiment of such an architecture is illustrated in FIG. 10d. The material in which the geometrically-structured voids are situated is deemed 800, as in FIG. 8, although the designation is essentially equipollent in respect to material 700 from FIG. 7. Within this thin planar material 800, a co-planar plurality of retroreflector voids 500 are fabricated, with their base 502 situated at the nominal top of layer 800 and their tip apertures 501 situated in close registered contact with the concentrator voids 1001, such as is positionally disclosed in FIG. 10c in regard to the nature of the respective position of the concentrator void and the retroreflector void. The concentrator voids 1001 are likewise fabricated within material 800, such that the large base of the void 1004 is positioned on the surface opposite of the nominal top where the retroreflector bases 502 are situated (this may be termed the nominal bottom surface of the layer 800, which would be the surface to be placed in contact or near-contact or in spaced-apart relation to the flat panel display to be enhanced). While the regions 500 and 1001 are specific void geometries, there is no reason that the void need be a vacuum or filled with air: it need only be filled with a material of lower refractive index than material 800, such that the greater respective ratio of indices, the better the total internal reflection and required optical behavior, in both the concentrator and the retroreflector. This would be the inverse architecture of that described earlier wherein the region between the concentrators may be filled with a relative low refractive index material, such as an aerogel, and still perform as desired. In all cases, the solid structures presumed in FIG. 10*a* can be inverted (solid for void, void for solid) as shown in FIG. 10*d* and still provide comparable performance.

Anti-Stiction

In embodiments described herein, the reduced area of contact (if contact rather than near-contact occurs during actuation and propelling of the element/membrane 402 toward waveguide 403) reduces stiction between the movable element and the waveguide, which may provide mechanical advantages for such MEMS-based actuation schemas. While the reduction in surface area occasioned by the total aggregate contact area being reduced to the sum of the areas 501 at the flattened distal ends of the coplanar plurality of retroreflectors is significant (nominally falling between 4% and 10% of the original stiction force due to reduced contact area), there remain additional means to reduce stiction.

Superaddition of a microscopic coating of a low surface energy material on one or both of the surfaces to make contact will both reduce surface energy and stiction but may also improve optical coupling across the contact plane between the waveguide 403 and the solid retroreflector flattened ends 501. Therefore, the incorporation of such means may be performed within both the unadorned systems shown in FIG. 2, FIG. 3, and FIG. 4, as well as in the enhanced contrast ratio systems delineated in FIG. 5 and FIG. 9*b*. The location of the low surface energy coating (e.g., dodecane) may be on either the surface of each distal end 501 of the coplanar plurality of retroreflector structures 500 and/or on the top surface 902 of the TIR waveguide. The amount of material required is very small, amounting to under 50 nanometers in thickness, to acquire the desired mechanical behavior and reduction in stiction and surface energy.

Packing Geometries

While FIG. 5*d* shows a triangular packing structure for the coplanar plurality of retroreflector structures 500, it should be understood that the boundary conditions for the non-corner edges of the retroreflector geometries may be configured as comprising either an equilateral triangle, as described earlier, or as a hexagon, or as a circle. The packing possibilities for any and all such variations are also included in the present invention, including the alternating triangle packing explicitly shown in FIG. 5*d* for a sample size of 13 contiguous retroreflector structures 500, for hexagonal packing whereby every other row is offset by one-half the length of the retroreflector base, and rectangular packing where the retroreflectors form an arbitrary rectangular array where the rows and columns are in mutual alignment. The triangular packing structure may be fabricated using a diamond turning processes to create large surfaces of considerable extent bearing a large number of microscopic retroreflectors fabricated into the surface of the carrier material 505 (see FIG. 5*e*).

Certain types of displays may not necessarily require the presence of the concentrator structures 1001 shown in FIG. 10. The utility of such concentrators may be limited by the Lorentz invariant involved (i.e., etendue limitations), which places constraints on how far light initially emitted into a large solid angle from the display surface can be concentrated through a small aperture, such as the equilateral aperture 501 registered with respect to the top 1002 of the concentrator structures 1001. This circumstance does not, in itself, hinder display performance in regard to contrast ratio and beneficial handling of incident light. Principles of a concentrator-free variation are illustrated in FIG. 12.

In FIG. 12*a*, the display 1201 to be enhanced has a superadded layer 404 disposed parallel to the display's surface, said super-added layer comprising an array of whole (not truncated) corner-cube retroreflectors 500. FIG. 12*a* identifies the presence of a representative retroreflector 500 by labeling the associated facet 504, but it should be understood the presence of a facet 504 of an element 500 presumes the presence of the entire element 500. The retroreflectors shown in FIG. 12*a* lack the flattened vertex 501 heretofore described in connection with all corner-cube retroreflectors (as in FIGS. 5, 9, 10, and 11.) FIG. 12*b* shows the already-known architecture wherein the tips of the corner-cube retroreflectors are truncated and flattened 501 as disclosed earlier. In either of these two variations (FIG. 12*a* and FIG. 12*b*), the image emitted from the display 1201 passes through the superadded layer 404 for viewing by the observer, while ambient light incident upon the top surface 402 of said layer 404 will undergo the previously disclosed path reversal upon encountering the facets of the corner-cube retroreflectors 500 (represented by the facet 504 so-labeled), thereby preventing reflection of ambient light into the viewer's eyes. As before, broadband anti-reflective coatings may be present at all relevant interfaces within the optical stack to further reduce parasitic contributions to the total ambient light reflected into the viewer's eyes.

Figure 14:
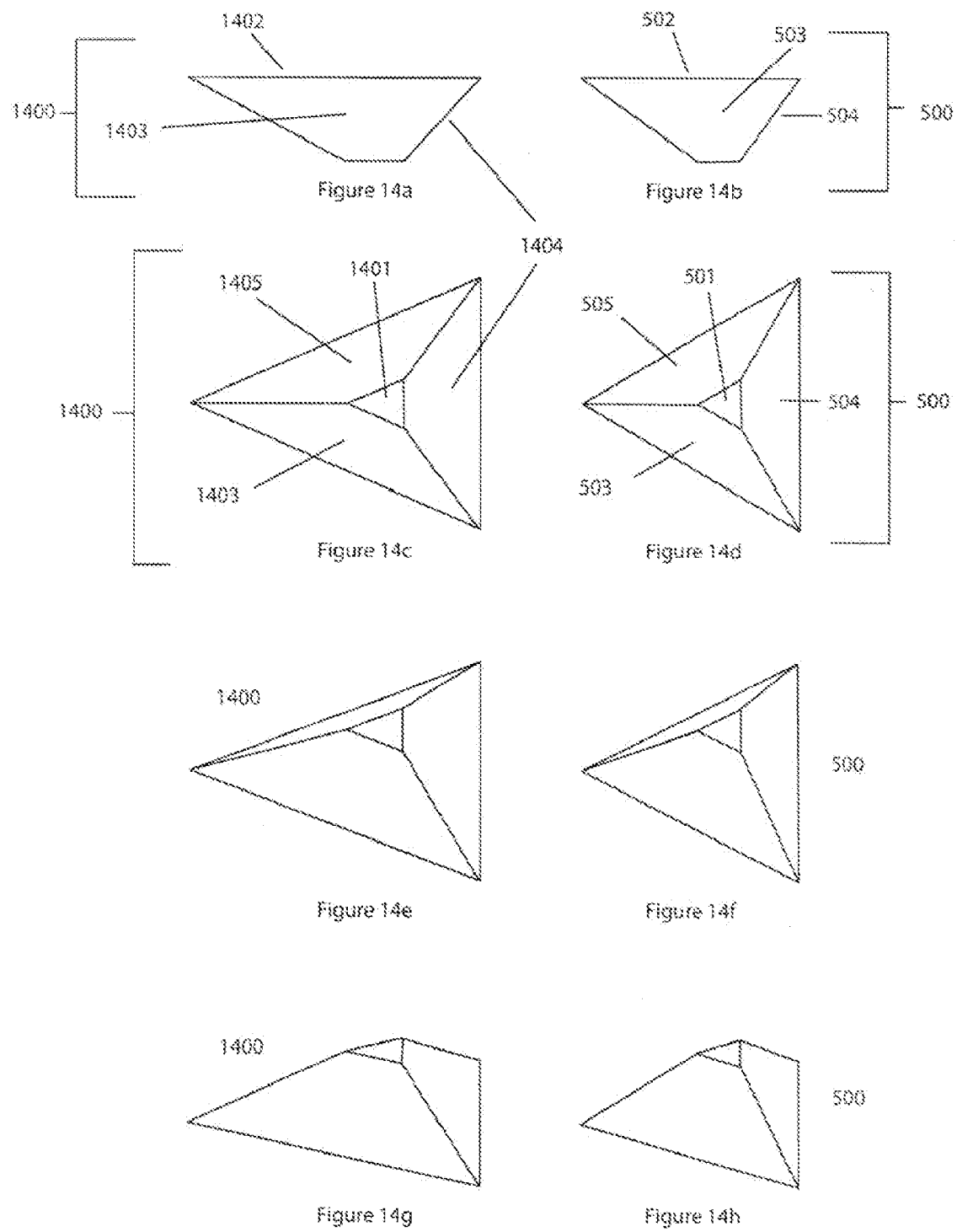
FIGS. 14a-14h show embodiments in which the corner-cube retroreflectors of FIG. 12 or FIG. 13 are tilted and re-oriented to alter the light emission distribution pattern of an optical array applied to a flat panel display surface.
Figure 15:
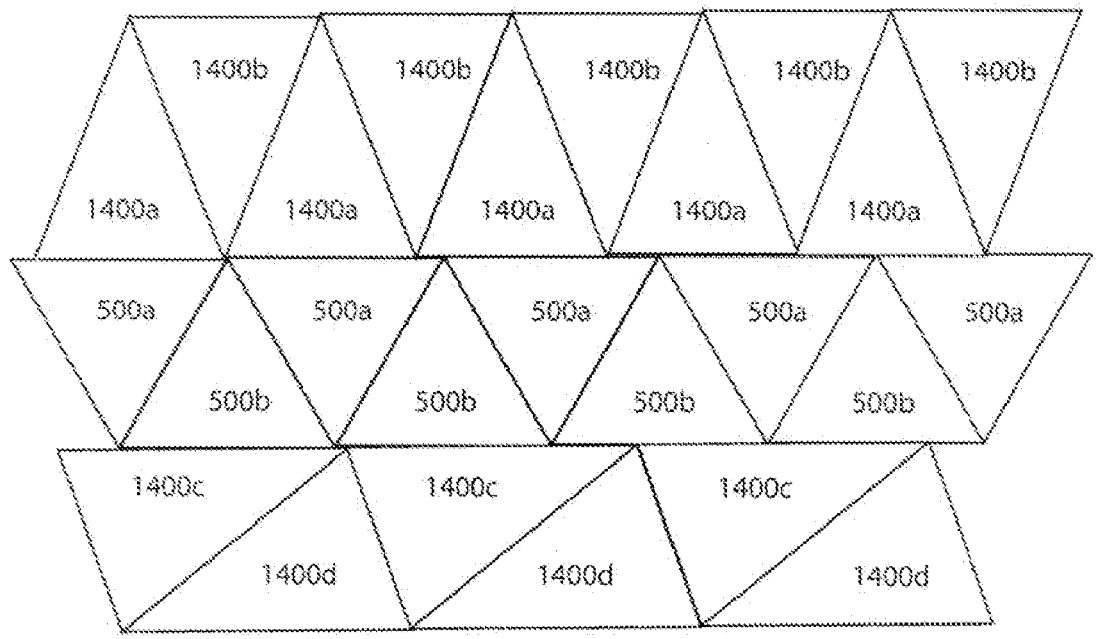
FIG. 15 shows an optically useful packing geometry for both tilted and non-tilted corner-cube retroreflectors calculated to improve an angular output distribution from a display system of which the array is a part.

The presence of layer 404 on top of the display 1201 does have an effect on the image being viewed, insofar as the angular distribution of energies from the display may be altered (subtly or substantially). Computer modeling reveals the potential for up to half of the on-axis light energy emitted from the display 1201 to be redistributed to regions that are off-axis, such that the highest concentration of energy may form an annulus around the on-axis viewing position. Where this is not an issue, the designs disclosed in FIG. 12 will be adequate to provide the desired performance characteristics with acceptable alteration of the emitted image. If the original output distribution of display 1201 is critical, then an additional variation on the architecture disclosed in FIG. 12 can mitigate its inherent propensity to redistribute optical energy into a higher intensity annulus surrounding an on-axis region of somewhat lower intensity. The improvement, if required by application exigencies, is illustrated in FIGS. 14 and 15 and is explained below.

It is evident that the truncated aperture 501 of the corner-cube retroreflector structures that boost the effective contrast ratio of the display system of which they are an integral part (as disclosed above) represents a small area relative to the entire surface area of the display panel proper. For the first embodiment, this fact is overcome by the circumstance that the TIR waveguide is sufficiently mirrored on its four non-TIR faces that when injected light reaches equilibrium inside the waveguide, the outflow of optical energy tends to equalize between activated pixels and all the other exit paths for light energy.

Figure 13:
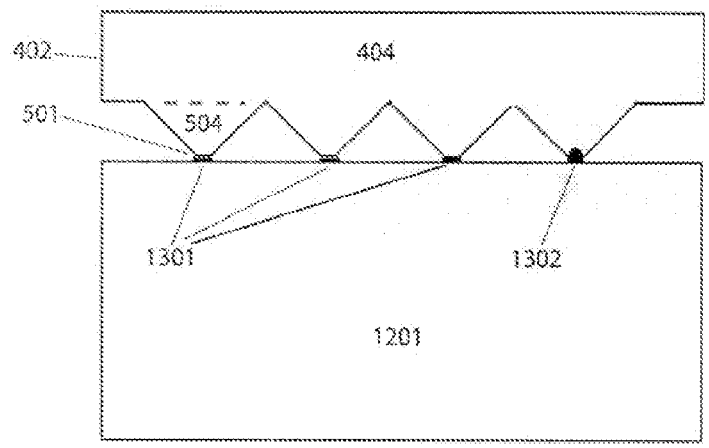
FIG. 13 shows an embodiment in which a selectively controllable emissive means for light generation, such as a photoluminescent material, (which may be a phosphor, light emitting polymer, etc.), or light emitting diode, is situated at, within, or in juxtaposition to the truncated vertex of a corner-cube retroreflector.
Figure 13:
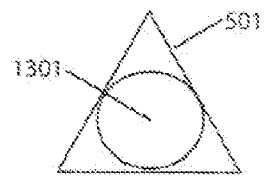
Figure 13:
Figure 13:
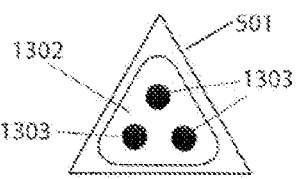

Emissive display systems may take advantage of the present invention by properly situating the emissive element at, near, or embedded within, the corner-cube retroreflector (in proximity to flattened region 501). FIG. 13 illustrates where such emissive means can be located to acquire the desirable contrast ratio enhancement within the context of an emissive display system. It should be understood that the emissive means may be a photoluminescent material (such as a phosphor or light emitting polymer, etc.), an organic light emitting diode, or other emissive technology, without limitation, and that the present invention is not limited in respect to the specific emissive means to be situated in proximity to the region 504 of the retroreflector structures 500. For example, some emissive systems use wavelength down-conversion to generate monochromatic light. In such systems, an exciting light of higher frequency (e.g., ultraviolet light), when passing into the down-converting material, causes monochromatic light to be generated, effectively converting UV light into, say, red, or green, or blue light, or as called for by the panel's design. Up-converting systems are included by implication as well within the domain of the present invention, as being but one additional example of the generalized class of emissive means hitherto reference. The photoluminescent material may have an associated selective reflector situated near the retroreflector's bottom, 501, which would reflect the emissive light but transmit the exciting light. The selective reflector would choose light on the basis of frequency. It would pass the exciting light from the top of the waveguide, 1201, into the photoluminescent material. The photoluminescent material would emit light of a different frequency in all directions. The emissive light that struck the selective reflector would be reflected up and out of the top layer, 404. Different photoluminescent material may be used to generate blue, green, and red emissive light or any suitable combination of materials that when combined can reproduce a color gamut.

Emissive means that do not penetrate (or end up embedded within) the retroreflective but are simply in contact, or near-contact, with the flattened region 501 of the retroreflective structures, are identified as elements 1301 in FIG. 13a. The various portions of FIG. 13 illustrate the position that the emissive element(s) has/have with respect to the retroreflector's smaller flat surface 501. A top-down plan view of the interface of the emissive means 1301 and the flat surface 501 is illustrated in FIG. 13b where the emissive element may be a circular region. Alternatively, the available area 501 would entail filling the equilateral triangle with an emissive means also adapted to the triangular shape, such as illustrated in FIG. 13c, where the emissive element 1301 is itself triangular in shape, without exceeding the geometric boundary of flat surface 501.

Embedding the emissive element inside the retroreflector is illustrated in FIG. 13a where the embedded emissive element is identified as 1302. Note that the element does extend above the plane of 501 a small distance into the retroreflector. The same principles enunciated above regarding the plan views in FIGS. 13b and 13c are equally applicable. It is possible, for example, to embed a suitably sized multi-LED (a multi-LED is a three-color composite light emitting diode (LED) that may have separate red, green, and blue dies within a single package). This is illustrated in plan view in FIG. 13d, where the three distinct dies (representing red, green, and blue, for example) are labeled 1303 while the composite package of which they are a part is denoted by 1302. The multi-LED system fits within 501 and thus can be embedded within the retroreflector. Given the size of such multi-LED, and/or monochromatic LED, display systems, the resulting display will be large, and well-suited to form factors associated with outdoor use (such as stadium-style flat panel displays viewed by thousands of people outdoors). The principle disclosed can readily be generalized to other emissive technologies and is not to be limited to photoluminescent materials, LEDs or other technologies.

Titled Corner-Cube Retroreflectors

FIG. 14 provides several views to illustrate the difference between a standard orientation of a corner-cube retroreflector and a tilted corner-cube retroreflector. The side view of a corner-cube retroreflector is shown in FIG. 14b, where the base 502 is situated at the top, facet 503 is facing outward, and facet 504 is seen in profile at the right. As disclosed earlier, the angle that 504 makes with the adjacent corner-cube retroreflector that would appear to its right is 70.58 degrees. For all untilted corner-cube retroreflectors (meaning all retroreflectors shown so far in this disclosure), that means the angle made between any of the three facets (503, 504, and 505) with the base (502) is 90°–(70.58°/2), viz., 54.71°. In this way, all three facets 503, 504, and 505 are at 90° with respect to one another.

The essential structure of the corner-cube retroreflector in 14b can be rotated or tilted such that the facets change position but the base (1402 in FIG. 14a) remains coplanar with the original base 502 of FIG. 14b, while the flattened region 1401 remains coplanar with the original untilted region 501. (The coplanarity of 1402 with 502 and 1401 with 501 is achieved by altering the geometry to ensure these results: merely tilting the entire corner-cube retroreflector 500 will not create the desired geometry 1400.) A plan view of the same modification is illustrated in FIG. 14c, which contrasts with the untilted retroreflector 14d. Additional perspective views of the tilted and untilted variants are set forth in FIGS. 14e and 14g (tilted) and FIGS. 14f and 14h (untilted).

Tilted corner-cube retroreflectors 1400 differ from their untilted counterparts not only geometrically (the base 502 and flat region 501 are equilateral triangles for an untilted retroreflector, but become isosceles triangles 1402 and 1401 respectively in a tilted retroreflector), but also in respect to output behavior. The distinctive output distribution of a tilted retroreflector compared to an untilted retroreflector is offset by an amount that is a function of the tilt angle (an angle of 10° is used in FIGS. 14a, 14c, 14e, and 14g as a representative tilt, although the present invention is not limited to this tilt angle). However, the handling of incident ambient light is essentially identical to that of an untilted corner-cube retroreflector. The difference in output distribution can be exploited to improve the performance of the display being enhanced by the present invention by creating a suitable mixture of the various orientations in the array to be fabricated. Such a mixture of orientations and tilts is illustrated in FIG. 15.

FIG. 15 depicts a plan view looking down on the bases of an array of corner-cube retroreflectors. The untilted retroreflectors can be oriented as either 500a or 500b, the difference being that they face opposite directions (up and down in FIG. 15). The untilted retroreflectors are shown as equilateral triangles, which indeed is the shape of their bases 502 as established from the outset. The tilted retroreflectors, the bases of which are isosceles triangles, identified earlier as base 1402 in FIG. 14, can be oriented with their long axial vertex facing up (1400a), facing down (1400b), facing right (1400c) or facing left (1400d). Other packing arrangements are feasible as well, but the provisional arrangement depicted in FIG. 15, which maximizes the possible variations, causes the annulus distribution mentioned earlier to be changed into a more nearly Lambertian distribution, which is generally considered desirable for display applications. It is self-understood that the variations shown in FIGS. 14 and 15 can be generally applied to any of the embodiments and variations disclosed within this filing.

It should also be noted that such tilting of corner-cubes can be achieved using the hollow corner-cube retroreflector approach disclosed in FIG. 7 and FIG. 8, with the void being shaped in accordance with the principles set forth above.

FIG. 15 shows only a small representative subsection of the entire array to be configured. In fact, the region shown may be much smaller than one millimeter square in area. Naturally, the various packings are understood to be replicated left and right and up and down to extend the desired area to match the area of the display to be enhanced.

While the present invention has focused primarily on retroreflectors based on the three-sided corner-cube, there are other optical means by which retroreflection can be achieved and such means may be suitable for deployment within the present invention as an alternative to the retroreflectors based on corner-cube geometries described thus far. The present invention is to be understood as applying to all retroreflector technologies used in array form to enhance the contrast ratio performance of flat panel displays as disclosed herein. As an example of such an alternate approach to retroreflection, the cat's eye retroreflector and one possible embodiment of same shall be touched upon for illustrative purposes.

Figure 16:
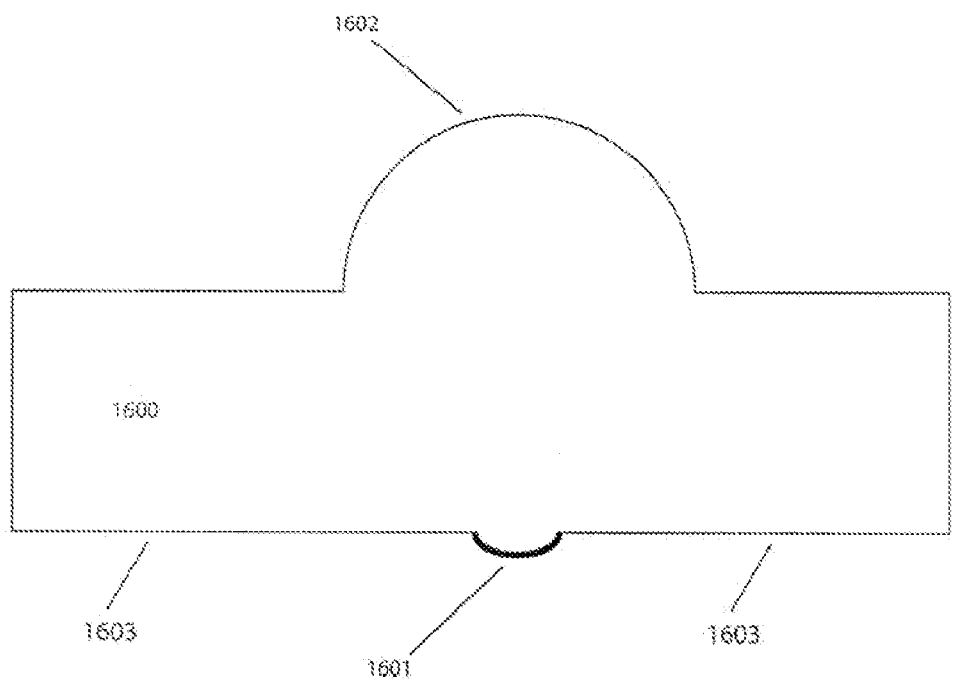
FIG. 16 illustrates an alternative approach to achieving retroreflector behavior in the present invention by setting forth the constituent elements comprising a cat's eye retroreflector, in contradistinction to a corner-cube retroreflector.

In FIG. 16, the layer 1600 is the same as the layer 404 disclosed in FIGS. 4, 12, 13, and 10*a* and is the same as layer 505 disclosed in FIG. 5*e* and element 700 disclosed in FIG. 7. Element 1600 is the base layer or substrate in which the light-modifying means to enhance contrast ratio performance are to be fabricated. In lieu of corner-cube retroreflectors being added to it (or subtracted from it to create voids to be mirrored, as in FIG. 7), a cat's eye retroreflector is shown. For ease of illustration, only a single cat's eye retroreflector is shown, but it must be understood that the entire structure 1600 is filled with a plurality of contiguous features (most probably in hexagonal packing to reduce interstitial spacing) as are about to be described.

The cat's eye retroreflector is composed of two elements: the outward facing lens 1602 and the display-facing reflector 1601. Light coming into the lens 1602 from the ambient environment is caused to strike the reflector 1601, which sends the light back to the lens 1602 (usually in a different location), whereby the light is refracted back into the outside world along a path parallel to the path of incidence where the light entered the lens initially. The curves of the lens 1602 and reflector 1601 are to be optimized in conjunction with their respective distance, insofar as the best performance of cat's eye retroreflectors involves setting their spatial distance at or near the focal length of the primary lens 1602. The shape of the reflector 1601 is likewise adjusted using calculations and techniques well-known to those skilled in the art of lens and reflector design. The thickness of the layer 1600 therefore contributes to, and fully determines, the size of both the lenses 1602 and reflectors 1601. The reflector 1601 must be a true reflector, and therefore is a region of the layer 1600 that must be suitably coated (with silver, aluminum, or other suitable reflective material).

However, the regions on the underside of 1600 that are contiguous to the coated reflector 1601 are not coated with reflective material but remain transparent; such regions are labeled 1603 in FIG. 16. Light output from the display passes through the uncoated regions 1603 and then through the lens 1602 to reach the human observer. The only light emitted from the display that is barred from immediately reaching the observer is the light that strikes reflector 1601. That light may be absorbed, reflected, or otherwise perturbed by the presence of reflector 1601.

The present invention is neither limited to this particular form of cat's eye retroreflector, not is it limited to only corner-cube retroreflectors and cat's eye retroreflectors, but embraces all mechanisms and geometries by which true retroreflection can be enabled within a planar embodiment, suited to sue for enhancing the contrast ratio performance of flat panel display systems ranging in size from wristwatch displays and cell phones up to laptop computer screens and extending to large screen televisions and sports stadium video display systems, or, more generally, to all displays that would benefit from the maximal improvement of contrast ratio attained by redirection of incident ambient light, particularly ambient light of high intensity (such as incident sunlight).

It should be appreciated that the number of retroreflector structures 500, per pixel (FIG. 4), is left indeterminate in this disclosure. However, some representative numbers can be rehearsed to suggest how the present invention would likely be implemented for a real world device. If the retroreflector structures 500 had a baseline edge 1103 that is 4 microns in length, and the fill factor for a pixel with 0.25 millimeter dot pitch is 78%, which prototypes of the invention originally disclosed in U.S. Pat. No. 5,319,491 support, one would expect each pixel to contain over 6,000 retroreflector structures 500. Therefore, there is no limit to conceive of this enhancement in a way to assign a one-to-one correlation between each retroreflector and each pixel. In actual fact, many retroreflectors are likely to handle the light from a single pixel, as the example just rehearsed clearly demonstrates.

A number of embodiments of the invention have been described. Nevertheless, it will be understood that various modifications may be made without departing from the spirit and scope of the invention.

The invention claimed is:

1. A system for enhancing a contrast ratio of flat panel displays that utilize selectively controlled frustrated total internal reflection to turn pixels on and off, comprising:

a plurality of movable elements, operable for frustration of total internal reflection by way of suitable matching of refractive index between the plurality of movable elements and a waveguide in which total internal reflected light is trapped; and a plurality of corner-cube retroreflector structures added to a surface of each of the plurality of movable elements comprising a pixel, such that a vertex of each of the plurality of corner-cube retroreflector structures is oriented to face the waveguide in which total internal reflected light is trapped and available for selectively controllable frustration, entailing optical coupling and subsequent emission toward an observer's eye, wherein facets forming each of the plurality of corner-cube retroreflectors are at right angles to one another, and wherein each vertex of the plurality of corner-cube retroreflector structures is truncated and flattened so as to form a flat planar surface, nominally in a shape of an equilateral triangle, parallel to a surface of the waveguide, such that each said flat planar surface is in spaced-apart relation to the waveguide when the pixel is in its quiescent state at a distance sufficiently large to prevent frustration of total internal reflected light within the waveguide, and is propelled in tandem with a main body of the movable element into contact or near-contact in an active state of the pixel, thus frustrating total internal reflection and causing the pixel to emit optical energy heretofore trapped in the waveguide by selectively controllable means.

2. The system as recited in claim 1, wherein said plurality of corner-cube retroreflector structures are solid retroreflectors that themselves use total internal reflection to direct light, entering from an outside environment, back to a source of the light, such that reflected rays of the light travel parallel to incident rays of the light.

3. The system as recited in claim 2, wherein said solid corner-cube retroreflector structures are integrated within the movable elements.

4. The system as recited in claim 2, wherein said solid corner-cube retroreflector structures are superadded to the movable elements.

5. The system as recited in claim 1, further comprising:
a broad-band anti-reflective coating disposed on a top surface, facing the observer, of the movable elements;
a broad-band anti-reflective coating disposed on each truncated planar vertex of the corner-cube retroreflector structures, which faces the waveguide in which total internally reflected light is trapped; and
a broad-band anti-reflective coating disposed on one or both large surfaces of the waveguide in which total internally reflected light is trapped and subject to selectively controllable frustration in response to contact or near-contact with the movable element when said movable element is propelled from the quiescent spaced-apart relation to closer proximity or contact with the waveguide.

6. The system as recited in claim 1, further comprising:
light absorbing coatings applied to edges of the corner-cube retroreflector structures in the regions where the facets forming the corner-cube structure meet.

7. A system for enhancing a contrast ratio of flat panel displays that utilize conventional transmissive or emissive approaches to image generation, comprising:
a plurality of non-imaging transparent light concentrator structures to collect light emitted or transmitted from a display surface and funnel it, by way of concentration, into small apertures at a focusing tip of said concentrator structure; and
a plurality of corner-cube retroreflector structures on a surface of the display, such that vertices of the corner-cube retroreflector structures are oriented to face the display, wherein facets forming each of the plurality of corner-cube retroreflector structures are at right angles to one another, and wherein vertices of each of the plurality of corner-cube retroreflector structures are truncated so as to form a flat planar surface, nominally in a shape of an equilateral triangle, each of which is parallel to a surface of the display, such that focusing tips of the plurality of non-imaging transparent light concentrator structures are mated to the vertices.

8. The system as recited in claim 7, wherein said plurality of corner-cube retroreflector structures are hollow retroreflectors that are coated with a reflective material to ensure that light entering from outside of the display is directed back to a source of the light, such that reflected rays of incident light travel parallel to incident rays back to the source of the light, such retroreflector structures each comprising:
a void shaped with facets that are orthogonal to one another that is fabricated in a planar material, wherein a vertex of the facets is flattened to form an aperture through which light emitted by the display is focused by the non-imaging transparent light concentrator structures in order to be emitted to a viewer; and
a reflective coating applied to the facets of said void comprising the hollow retroreflector to insure appropriate retroreflective behavior when incident light enters a region of the void.

9. The system as recited in claim 8 wherein a thickness of the planar material in which the void is formed is greater than a height of the void, such that only a concave region occurs on a surface of the planar material in which a base end of the retroreflectors is situated.

10. The system as recited in claim 8 wherein a thickness of the planar material in which the void is formed is equal to a height of the void, such that the void represents a through-hole with its larger aperture facing the viewer and its smaller aperture facing the focusing tip with which it is associated.

11. The system as recited in claim 7 in which the plurality of non-imaging transparent light concentrator structures are compound parabolic concentrators with a circular cross-section.

12. The system as recited in claim 7 in which the plurality of non-imaging transparent light concentrator structures are tetrahedrons that are compressed or extended mirror images of their associated retroreflector structures, a difference being that facets of each tetrahedral concentrator are specifically non-orthogonal in orientation to one another.

13. A system for enhancing a contrast ratio of a display that utilizes conventional transmissive or emissive approaches to image generation comprising a plurality of coplanar corner-cube retroreflector structures added to a surface of the display, such that vertices of the plurality of coplanar corner-cube retroreflector structures are oriented to face the display, wherein facets forming the corner-cube retroreflector structures of corner-cube retroreflector structures are truncated so as to form a flat planar surface, nominally in a shape of an equilateral triangle, each of which is parallel to the surface of the display, such that a plane defined by the equilateral triangle truncated surfaces is in contact, or in near contact, with the display.

14. The system as recited in claim 13 where the corner-cube retroreflectors are not truncated, such that the facets that form the corner-cube all meet at a common vertex.

15. The system as recited in claim 13, wherein an emissive means is embedded within the plurality of coplanar retroreflector structures, passing through the plane of the flattened surface of a truncated corner-cube.

16. The system as recited in claim 13, wherein one or more of the corner-cube retroreflector structures is tilted in orientation with respect to its neighboring corner-cube retroreflector structures, such that its facets remain at ninety degrees with respect to one another while a base and flattened surface of the truncation remain essentially coplanar with any neighboring non-tilted corner-cube retroreflector structures.

17. The system as recited in claim 16, wherein the base and flattened surface of the truncated corner-cube retroreflector structures that are tilted form isosceles triangles.

18. The system as recited in claim 16, wherein areal packing of tilted and non-tilted corner-cube retroreflector structures whose bases are coplanar optimize a balance between orientations of said corner-cube retroreflector structures to improve an output distribution of light emitted from the display.

19. The system as recited in claim 18, wherein retroreflection behavior is achieved with a non-corner-cube retroreflector.

20. The system as recited in claim 19, wherein the non-corner-cube retroreflector is configured as a cat's eye retroreflector.

21. The system as recited in claim 20 wherein the cat's eye retroreflector is configured as an outward-facing lens structure centered over a smaller curved region at or near a focal length of said lens structure, said smaller curved region being coated with a reflective material to form, in conjunction with a lens, a cat's eye retroreflector such that light emitted from the display passes around the region, passing through the outward-facing lens structure to reach the observer's eyes.

* * * * *

UNITED STATES PATENT AND TRADEMARK OFFICE
CERTIFICATE OF CORRECTION

PATENT NO.         : 7,450,799 B2                                Page 1 of 1
APPLICATION NO.    : 11/766007
DATED              : November 11, 2008
INVENTOR(S)        : Martin G. Selbrede It is certified that error appears in the above-identified patent and that said Letters Patent is hereby corrected as shown below:

On the Title page, in the list of Inventors, please correct the address of the first named inventor and delete "Conroe" and insert --The Woodlands--;

On the Title page, in the list of Inventors, delete "B. Tod Cox" and insert --Berry Tod Cox--;

Item 57 Abstract, Title page, column 2, line 14 delete "than the" and insert --than into the--;

Column 24, lines 34-35, in Claim 13 delete "structures of" and insert --structures are at right angles to one another, and wherein vertices of each of the plurality of--;

Column 26, line 3, in Claim 21, delete "a" and insert --the--. 1st occurrence

Signed and Sealed this

Twenty-fourth Day of February, 2009

JOHN DOLL
*Acting Director of the United States Patent and Trademark Office*